US012374282B2

(12) United States Patent
Zhao

(10) Patent No.: US 12,374,282 B2
(45) Date of Patent: Jul. 29, 2025

(54) METHOD FOR ADJUSTING DRIVE VOLTAGE OF DISPLAY ASSEMBLY AND TERMINAL DEVICE

(71) Applicant: HONOR DEVICE CO., LTD., Guangdong (CN)

(72) Inventor: Jing Zhao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/042,641

(22) PCT Filed: Sep. 5, 2022

(86) PCT No.: PCT/CN2022/117049

§ 371 (c)(1),
(2) Date: Feb. 23, 2023

(87) PCT Pub. No.: WO2023/098198

PCT Pub. Date: Jun. 8, 2023

(65) Prior Publication Data

US 2024/0096278 A1 Mar. 21, 2024

(30) Foreign Application Priority Data

Dec. 3, 2021 (CN) ......................... 202111471055.7

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0819* (2013.01); (Continued)

(58) Field of Classification Search
None
See application file for complete search history.

(56) References Cited

U.S. PATENT DOCUMENTS 9,013,466 B2 4/2015 Chien et al.
9,305,502 B2 4/2016 Guo et al.
(Continued)

FOREIGN PATENT DOCUMENTS

CN 102427517 A 4/2012
CN 103177693 A 6/2013
(Continued)

*Primary Examiner* — Benjamin X Casarez

(57) ABSTRACT

A method for a terminal device with an active light-emitting display assembly, includes: obtaining image data of an $N^{th}$ frame of image, where N is a positive integer; obtaining a highest gray scale of the $N^{th}$ frame of image according to the image data, where the highest gray scale of the $N^{th}$ frame of image is a maximum value of gray scales corresponding to pixels in the $N^{th}$ frame of image; obtaining a drive voltage of the $N^{th}$ frame of image according to the highest gray scale of the $N^{th}$ frame of image, where the drive voltage of the $N^{th}$ frame of image is a voltage required in a case that the display assembly displays the $N^{th}$ frame of image; and sending a voltage adjustment amount of the $N^{th}$ frame of image to the display assembly.

19 Claims, 12 Drawing Sheets

(52) U.S. Cl.
CPC ............... *G09G 2300/0842* (2013.01); *G09G 2300/0861* (2013.01); *G09G 2320/0233* (2013.01); *G09G 2330/023* (2013.01)

(56) References Cited

U.S. PATENT DOCUMENTS

| | | | | |
|---|---|---|---|---|
| 10,417,995 | B2 | 9/2019 | Xu et al. | |
| 2007/0262927 | A1 | 11/2007 | Jeon et al. | |
| 2010/0033475 | A1 | 2/2010 | Choi et al. | |
| 2014/0204069 | A1* | 7/2014 | Chien .................. | G09G 3/3291 345/212 |
| 2015/0097872 | A1* | 4/2015 | Jeong ................... | G09G 3/3225 345/77 |
| 2021/0065623 | A1* | 3/2021 | Hong ................... | G09G 3/3275 |
| 2021/0174762 | A1* | 6/2021 | Sun ...................... | G09G 3/2007 |
| 2022/0198998 | A1* | 6/2022 | Park ..................... | G09G 3/2007 |
| 2023/0237948 | A1* | 7/2023 | He ....................... | G09G 3/2007 345/690 |

FOREIGN PATENT DOCUMENTS

| | | | |
|---|---|---|---|
| CN | 103559860 | A | 2/2014 |
| CN | 103594065 | A | 2/2014 |
| CN | 104793423 | A | 7/2015 |
| CN | 105528994 | A | 4/2016 |
| CN | 106292016 | A | 1/2017 |
| CN | 106791743 | A | 5/2017 |
| CN | 110197641 | A | 9/2019 |
| CN | 111048040 | A | 4/2020 |
| CN | 113223470 | A | 8/2021 |
| KR | 20070109030 | A | 11/2007 |
| KR | 20100018322 | A | 2/2010 |

* cited by examiner

METHOD FOR ADJUSTING DRIVE VOLTAGE OF DISPLAY ASSEMBLY AND TERMINAL DEVICE

This application is a national stage of International Application No. PCT/CN2022/117049, filed on Sep. 5, 2022, which claims priority to Chinese Patent Application No. 202111471055.7, filed on Dec. 3, 2021. The disclosures of both of the aforementioned applications are hereby incorporated by reference in their entireties.

TECHNICAL FIELD

This application relates to the field of display technologies, and specifically, to a method for adjusting a drive voltage of a display assembly and a terminal device.

BACKGROUND

An active light-emitting display assembly is a display assembly that emits light by using a semiconductor and a light-emitting material through injection and recombination of carriers under the driving of an electric field. The active light-emitting display assembly usually uses thin film transistors (thin film transistor, TFT) and capacitors to store signals to control light-emitting bodies (such as, light-emitting diodes) to display gray scales of brightness. For example, a display region of the active light-emitting display assembly may include a pixel matrix with a plurality of rows and a plurality of columns, each pixel may include a pixel driving circuit, and the pixel driving circuit may be formed by at least one thin film transistor and one capacitor.

Currently, a fixed drive voltage is usually used for the active light-emitting display assembly. For example, if the pixel driving circuit uses a working manner of a fixed voltage, the fixed voltage needs to meet a requirement for maximum brightness of pixels, that is, to meet a highest gray scale of brightness. However, content displayed in the active light-emitting display assembly changes dynamically, and not all display content appear at the highest gray scale of the brightness. By using the working manner of the fixed voltage, the power consumption of the active light-emitting display assembly is relatively large.

Therefore, how to adjust a drive voltage of a display assembly in a case of ensuring a normal display, so as to reduce the power consumption of the display assembly is a problem to be solved.

SUMMARY

This application provides a method for adjusting a drive voltage of a display assembly and a terminal device, which can reduce the drive voltage of the display assembly in a case of ensuring a normal display of an image, so as to reduce the power consumption of the display assembly.

According to a first aspect, a method for adjusting a drive voltage of a display assembly is provided, and is applied to a terminal device, where the terminal device includes an active light-emitting display assembly, and the method includes:

obtaining image data of an $N^{th}$ frame of image, where N is a positive integer;

obtaining a highest gray scale of the $N^{th}$ frame of image according to the image data, where the highest gray scale of the $N^{th}$ frame of image is a maximum value of gray scales corresponding to pixels in the $N^{th}$ frame of image;

obtaining a drive voltage of the $N^{th}$ frame of image according to the highest gray scale of the $N^{th}$ frame of image, where the drive voltage of the $N^{th}$ frame of image is a voltage required in a case that the display assembly displays the $N^{th}$ frame of image; and sending a voltage adjustment amount of the $N^{th}$ frame of image to the display assembly, where the voltage adjustment amount of the $N^{th}$ frame of image is obtained according to the drive voltage of the $N^{th}$ frame of image.

In this embodiment of this application, a drive voltage required when a display assembly displays an $N^{th}$ frame of image may be determined according to a highest gray scale of the $N^{th}$ frame of image, and a drive voltage of the display assembly may be adjusted according to the drive voltage of the $N^{th}$ frame of image. In this embodiment of this application, for different display content, the display assembly may use different drive voltages, that is, the drive voltage of the display assembly can be dynamically adjusted according to display content. Therefore, compared with that the display assembly uses a manner of a constant drive voltage, in this embodiment of this application, the drive voltage of the display assembly can be reduced in a case of ensuring a normal display of the image, so as to reduce the power consumption of the display assembly.

It should be understood that, in this embodiment of this application, the display assembly displays image data of the $N^{th}$ frame of image through a pixel driving circuit.

It should be further understood that, because one frame of image corresponds to one drive voltage, that is, a plurality of pixel driving circuits included in one frame of image share one drive voltage, it is necessarily ensured that the drive voltage enables that a highest gray scale in one frame of image can be normally displayed. In this embodiment of this application, a value of a drive voltage required when a display assembly displays an $N^{th}$ frame of image, namely, a minimum voltage required when displaying the $N^{th}$ frame of image, may be determined through a highest gray scale of the $N^{th}$ frame of image. Under a condition of the same brightness, the highest gray scale of the $N^{th}$ frame of image determines a minimum voltage difference between a working voltage of a pixel driving circuit and the drive voltage. The working voltage usually does not change, and the drive voltage is adjusted so that the minimum voltage difference required when the display assembly displays the $N^{th}$ frame of image is met.

With reference to the first aspect, in some implementations of the first aspect, the voltage adjustment amount of the $N^{th}$ frame of image is a voltage value of the drive voltage of the $N^{th}$ frame of image.

Optionally, in an implementation, the voltage value of the drive voltage of the $N^{th}$ may be directly sent to the display assembly.

With reference to the first aspect, in some implementations of the first aspect, the voltage adjustment amount of the $N^{th}$ frame of image is a voltage difference between the drive voltage of the $N^{th}$ frame of image and a first drive voltage, and the first drive voltage is a drive voltage of an $(N-1)^{th}$ frame of image.

Optionally, in an implementation, the voltage difference, namely, the voltage difference between the drive voltage when displaying the $(N-1)^{th}$ frame of image and the drive voltage of the $N^{th}$ frame of image, may be directly sent to the display assembly.

With reference to the first aspect, in some implementations of the first aspect, the obtaining a highest gray scale of the $N^{th}$ frame of image according to the image data includes:

obtaining a histogram of the $N^{th}$ frame of image according to the image data; and obtaining the highest gray scale of the $N^{th}$ frame of image according to the histogram of the $N^{th}$ frame of image.

With reference to the first aspect, in some implementations of the first aspect, the display assembly includes a pixel driving circuit, the pixel driving circuit includes a first thin film transistor and a light-emitting body, the first thin film transistor is configured to provide a drive current for the light-emitting body, and the obtaining a drive voltage of the $N^{th}$ frame of image according to the highest gray scale of the $N^{th}$ frame of image includes:

determining a drive current of the $N^{th}$ frame of image according to the highest gray scale of the $N^{th}$ frame of image, where the drive current of the $N^{th}$ frame of image is a current required in a case that the display assembly displays the $N^{th}$ frame of image through the pixel driving circuit; and determining the drive voltage of the $N^{th}$ frame of image according to the drive current of the $N^{th}$ frame of image and an output characteristic curve of the first thin film transistor.

In this embodiment of this application, the first thin film transistor is configured to provide the drive current for the light-emitting body, and a working voltage of the light-emitting body is proportional to a working current. By determining the highest gray scale of the $N^{th}$ frame of image, a value of a minimum current required when displaying the $N^{th}$ frame of image may be determined, and the voltage value, namely, the value of the drive voltage, required when displaying the $N^{th}$ frame of image may be determined according to the value of the minimum current.

With reference to the first aspect, in some implementations of the first aspect, the light-emitting body is any one of the following:

an organic light-emitting diode, an active-matrix organic light-emitting diode, a flexible light-emitting diode, a micro light-emitting diode, a micro organic light-emitting diode, or a quantum dot light-emitting diode.

With reference to the first aspect, in some implementations of the first aspect, in a case that a first slope of the output characteristic curve is not equal to 0, the first slope is a slope of the output characteristic curve in a saturation region, and the method further includes:

determining a current adjustment amount of the $N^{th}$ frame of image according to the drive voltage of the $N^{th}$ frame of image and the first slope; and determining a brightness compensation amount of the $N^{th}$ frame of image according to the current adjustment amount of the $N^{th}$ frame of image, where the brightness compensation amount of the $N^{th}$ frame of image is used for performing brightness compensation on the $N^{th}$ frame of image by the display assembly.

In this embodiment of this application, because the output characteristic curve of the first thin film transistor usually cannot reach an ideal state, that is, an output current of the first thin film transistor in the saturation region slightly changes with the voltage, brightness compensation may be performed on a displayed image through a brightness compensation amount, so that brightness of the displayed image reaches brightness corresponding to an output current when the saturation region is in the ideal state.

With reference to the first aspect, in some implementations of the first aspect, the method further includes:

sending the brightness compensation amount of the $N^{th}$ frame of image to the display assembly.

With reference to the first aspect, in some implementations of the first aspect, the method further includes:

receiving a synchronization signal sent by the display assembly, where the synchronization signal is used for indicating that the display assembly starts to display the $N^{th}$ frame of image; and sending the image data of the $N^{th}$ frame of image to the display assembly.

According to a second aspect, a terminal device is provided, where the terminal device includes an active light-emitting display assembly, a storage module, and a processing module;

the storage module is configured to store image data of an $N^{th}$ frame of image, where N is a positive integer; and the processing module is configured to obtain the image data of the $N^{th}$ frame of image from the storage module; obtain a highest gray scale of the $N^{th}$ frame of image according to the image data, where the highest gray scale of the $N^{th}$ frame of image is a maximum value of gray scales corresponding to pixels in the $N^{th}$ frame of image; obtain a drive voltage of the $N^{th}$ frame of image according to the highest gray scale of the $N^{th}$ frame of image, where the drive voltage of the $N^{th}$ frame of image is a voltage required in a case that the display assembly displays the $N^{th}$ frame of image; and send a voltage adjustment amount of the $N^{th}$ frame of image to the display assembly, where the voltage adjustment amount of the $N^{th}$ frame of image is obtained according to the drive voltage of the $N^{th}$ frame of image.

With reference to the second aspect, in some implementations of the second aspect, the voltage adjustment amount of the $N^{th}$ frame of image is a voltage value of the drive voltage of the $N^{th}$ frame of image.

With reference to the second aspect, in some implementations of the second aspect, the voltage adjustment amount of the $N^{th}$ frame of image is a voltage difference between the drive voltage of the $N^{th}$ frame of image and a first drive voltage, and the first drive voltage is a drive voltage of an $(N-1)^{th}$ frame of image.

With reference to the second aspect, in some implementations of the second aspect, the processing module is specifically configured to:

obtain a histogram of the $N^{th}$ frame of image according to the image data; and obtain the highest gray scale of the $N^{th}$ frame of image according to the histogram of the $N^{th}$ frame of image.

With reference to the second aspect, in some implementations of the second aspect, the display assembly includes a pixel driving circuit, the pixel driving circuit includes a first thin film transistor and a light-emitting body, the first thin film transistor is configured to provide a drive current for the light-emitting body, and the processing module is specifically configured to:

determine a drive current of the $N^{th}$ frame of image according to the highest gray scale of the $N^{th}$ frame of image, where the drive current of the $N^{th}$ frame of image is a current required in a case that the display assembly displays the $N^{th}$ frame of image through the pixel driving circuit; and determine the drive voltage of the $N^{th}$ frame of image according to the drive current of the $N^{th}$ frame of image and an output characteristic curve of the first thin film transistor.

With reference to the second aspect, in some implementations of the second aspect, in a case that a first slope of the output characteristic curve is not equal to 0, the first slope is a slope of the output characteristic curve in a saturation region, and the processing module is further configured to:

determine a current adjustment amount of the $N^{th}$ frame of image according to the drive voltage of the $N^{th}$ frame of image and the first slope; and determine a brightness compensation amount of the $N^{th}$ frame of image according to the current adjustment amount of the $N^{th}$ frame of image, where the brightness compensation amount of the $N^{th}$ frame of image is used for performing brightness compensation on the $N^{th}$ frame of image by the display assembly.

With reference to the second aspect, in some implementations of the second aspect, the processing module is further configured to:

send the brightness compensation amount of the $N^{th}$ frame of image to the display assembly.

With reference to the second aspect, in some implementations of the second aspect, the processing module is further configured to:

receive a synchronization signal sent by the display assembly, where the synchronization signal is used for indicating that the display assembly starts to display the $N^{th}$ frame of image; and send the image data of the $N^{th}$ frame of image to the display assembly.

With reference to the second aspect, in some implementations of the second aspect, the light-emitting body is any one of the following:

an organic light-emitting diode, an active-matrix organic light-emitting diode, a flexible light-emitting diode, a micro light-emitting diode, a micro organic light-emitting diode, or a quantum dot light-emitting diode.

According to a third aspect, a terminal device is provided, where the terminal device includes: one or more processors, a memory, and an active light-emitting display assembly, where the memory is coupled to the one or more processors, the memory is configured to store computer program code, the computer program code includes computer instructions, and the one or more processors invoke the computer instructions to cause the terminal device to perform the following steps:

obtaining image data of an $N^{th}$ frame of image, where N is a positive integer;

obtaining a highest gray scale of the $N^{th}$ frame of image according to the image data, where the highest gray scale of the $N^{th}$ frame of image is a maximum value of gray scales corresponding to pixels in the $N^{th}$ frame of image;

obtaining a drive voltage of the $N^{th}$ frame of image according to the highest gray scale of the $N^{th}$ frame of image, where the drive voltage of the $N^{th}$ frame of image is a voltage required in a case that the display assembly displays the $N^{th}$ frame of image; and sending a voltage adjustment amount of the $N^{th}$ frame of image to the display assembly, where the voltage adjustment amount of the $N^{th}$ frame of image is obtained according to the drive voltage of the $N^{th}$ frame of image.

With reference to the third aspect, in some implementations of the third aspect, the voltage adjustment amount of the $N^{th}$ frame of image is a voltage value of the drive voltage.

With reference to the third aspect, in some implementations of the third aspect, the voltage adjustment amount of the $N^{th}$ frame of image is a voltage difference between the drive voltage of the $N^{th}$ frame of image and a first drive voltage, and the first drive voltage is a drive voltage of an $(N-1)^{th}$ frame of image.

With reference to the third aspect, in some implementations of the third aspect, the one or more processors invoke the computer instructions to cause the terminal device to perform the following steps:

obtaining a histogram of the $N^{th}$ frame of image according to the image data; and obtaining the highest gray scale of the $N^{th}$ frame of image according to the histogram of the $N^{th}$ frame of image.

With reference to the third aspect, in some implementations of the third aspect, the display assembly includes a pixel driving circuit, the pixel driving circuit includes a first thin film transistor and a light-emitting body, the first thin film transistor is configured to provide a drive current for the light-emitting body, and for the obtaining a drive voltage of the $N^{th}$ frame of image according to the highest gray scale of the $N^{th}$ frame of image, the one or more processors invoke the computer instructions to cause the terminal device to perform the following steps:

determining a drive current of the $N^{th}$ frame of image according to the highest gray scale of the $N^{th}$ frame of image, where the drive current of the $N^{th}$ frame of image is a current required in a case that the display assembly displays the $N^{th}$ frame of image through the pixel driving circuit; and determining the drive voltage of the $N^{th}$ frame of image according to the drive current of the $N^{th}$ frame of image and an output characteristic curve of the first thin film transistor.

With reference to the third aspect, in some implementations of the third aspect, in a case that a first slope of the output characteristic curve is not equal to 0, the first slope is a slope of the output characteristic curve in a saturation region, and the one or more processors invoke the computer instructions to cause the terminal device to perform the following steps:

determining a current adjustment amount of the $N^{th}$ frame of image according to the drive voltage of the $N^{th}$ frame of image and the first slope; and determining a brightness compensation amount of the $N^{th}$ frame of image according to the current adjustment amount of the $N^{th}$ frame of image, where the brightness compensation amount of the $N^{th}$ frame of image is used for performing brightness compensation on the $N^{th}$ frame of image by the display assembly.

With reference to the third aspect, in some implementations of the third aspect, the one or more processors invoke the computer instructions to cause the terminal device to perform the following steps:

sending the brightness compensation amount of the $N^{th}$ frame of image to the display assembly.

With reference to the third aspect, in some implementations of the third aspect, the one or more processors invoke the computer instructions to cause the terminal device to perform the following steps:

receiving a synchronization signal sent by the display assembly, where the synchronization signal is used for indicating that the display assembly starts to display the $N^{th}$ frame of image; and sending the image data of the $N^{th}$ frame of image to the display assembly.

With reference to the third aspect, in some implementations of the third aspect, the light-emitting body is any one of the following:

an organic light-emitting diode, an active-matrix organic light-emitting diode, a flexible light-emitting diode, a micro light-emitting diode, a micro organic light-emitting diode, or a quantum dot light-emitting diode.

According to a fourth aspect, a chip system is provided. The chip system is applied to a terminal device, the chip system includes one or more processors, and the processors invoke computer instructions to cause the terminal device to perform the method according to the first aspect or any description of the first aspect.

According to a fifth aspect, a computer-readable storage medium is provided, storing computer program code, the computer program code, when executed by an electronic device, causing the electronic device to perform the method according to the first aspect or any description of the first aspect.

According to a sixth aspect, a computer program product is provided, including: computer program code, the computer program code, when executed by an electronic device, causing the electronic device to perform the method according to the first aspect or any description of the first aspect.

In this embodiment of this application, a drive voltage required when a display assembly displays an $N^{th}$ frame of image may be determined according to a highest gray scale of the $N^{th}$ frame of image, and a drive voltage of the display assembly may be adjusted according to the drive voltage of the $N^{th}$ frame of image. In this embodiment of this application, for different display content, the display assembly may use different drive voltages, that is, the drive voltage of the display assembly can be dynamically adjusted according to display content. Therefore, compared with that the display assembly samples a manner of a constant drive voltage, in this embodiment of this application, the drive voltage of the display assembly can be reduced in a case of ensuring a normal display of the image, so as to reduce the power consumption of the display assembly.

DESCRIPTION OF EMBODIMENTS

For ease of understanding, terms and concepts related to the embodiments of this application are first described.

1. Organic Light-Emitting Diode (Organic Light-Emitting Diode, OLED) Display Assembly A display principle of the OLED display assembly is to drive a semiconductor and a light-emitting material by an electric field, and emit light after injection and recombination of carriers.

2. Active-Matrix Organic Light-Emitting Diode (Active-Matrix Organic Light-Emitting Diode, AMOLED)

Driving manners of the organic light-emitting diode may be divided into passive driving and active driving. The AMOLED may emit light and display by using a semiconductor and a light-emitting material through injection and recombination of carriers under the driving of an electric field. For example, the AMOLED usually may use thin film transistors (thin film transistor, TFT) and capacitors to store signals to control presentation of gray scales of brightness displayed by OLEDs.

3. Pixel Driving Circuit

A display region of a display assembly may include a pixel matrix with a plurality of rows and a plurality of columns, each pixel may include a pixel driving circuit, and the pixel driving circuit may display different pixel points. The pixel driving circuit is a driving circuit formed by at least one thin film transistor and at least one capacitor. For example, the pixel driving circuit may include, but is not limited to: 7T1C, 6T1C, 3T1C, and the like.

4. Gray Scale

The gray scale refers to dividing a brightness change between brightest brightness and darkest brightness into several parts, so that screen brightness can be controlled by an input signal.

The following describes technical solutions in the embodiments of this application in detail with reference to accompanying drawings.

Figure 1:
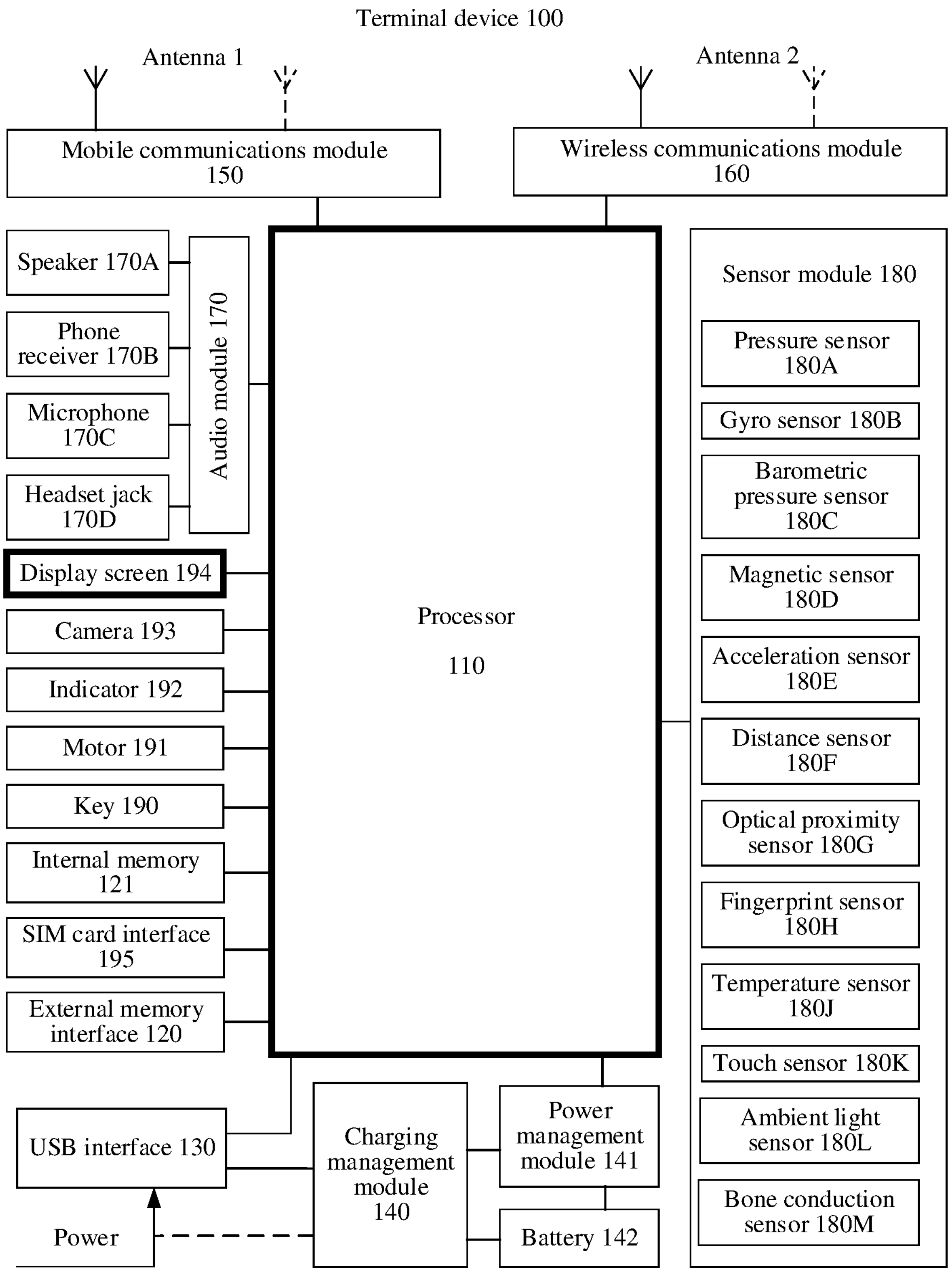
FIG. 1 is a hardware system of a terminal device applicable to this application.

FIG. 1 is a hardware system of a terminal device applicable to this application.

A terminal device 100 may be a mobile phone, a tablet computer, a smart screen, a wearable electronic device, an in-vehicle electronic device, an augmented reality (augmented reality, AR) device/a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the terminal device 100 is not limited in the embodiments of this application.

The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It should be understood that a connection relationship among the modules in FIG. 1 is merely an example for description, and constitutes no limitation on the connection relationship among the modules of the terminal device 100. Optionally, the modules of the terminal device 100 may alternatively use a combination of a plurality of connection manners in the above embodiment.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, or a neural-network processing unit (neural-network processing unit, NPU). Different processing units may be independent components, or may be integrated components.

The controller may generate an operation control signal according to instruction operation code and a time-sequence signal, to implement control of fetching an instruction and executing the instruction.

The processor 110 may be further configured with a memory, to store an instruction and data. In some embodiments, the memory in the processor 110 is a cache memory. The memory may store an instruction or data that is recently used or cyclically used by the processor 110. If the processor 110 needs to use the instruction or the data again, the processor 110 may directly invoke the instruction or the data from the memory, which avoids repeated access, and reduces a waiting time of the processor 110, thereby improving system efficiency.

In this embodiment of this application, the processor 110 may execute the following steps: obtaining image data of an $N^{th}$ frame of image, where N is a positive integer; obtaining a highest gray scale of the $N^{th}$ frame of image according to the image data, where the highest gray scale of the $N^{th}$ frame of image is a maximum value of gray scales corresponding to pixels in the $N^{th}$ frame of image; obtaining a drive voltage of the $N^{th}$ frame of image according to the highest gray scale of the $N^{th}$ frame of image, where the drive voltage of the $N^{th}$ frame of image is a voltage required in a case that the display assembly displays the $N^{th}$ frame of image; and sending a voltage adjustment amount of the $N^{th}$ frame of image to the display assembly, where the voltage adjustment amount of the $N^{th}$ frame of image is obtained according to the drive voltage of the $N^{th}$ frame of image.

The charging management module 140 is configured to receive power from the charger. The charger may be a wireless charger, or may be a wired charger. In some embodiments of wired charging, the charging management module 140 may receive a current of the wired charger through the USB interface 130. In some embodiments of wireless charging, the charging management module 140 may receive electromagnetic waves by using a wireless charging coil of the terminal device 100 (where a current path is shown by a dotted line). While charging the battery 142, the charging management module 140 may further supply power to the terminal device 100 by using the power management module 141.

The power management module 141 is configured to be connected to the battery 142, the charging management module 140, and the processor 110. The power management module 141 receives input of the battery 142 and/or the charging management module 140, and supplies power for the processor 110, the internal memory 121, the display screen 194, the camera 193, the wireless communications module 160, and the like. The power management module 141 may also be configured to monitor parameters such as a battery capacity, a quantity of battery cycles, and a battery health status (such as power leakage and impedance). Optionally, the power management module 141 may be disposed in the processor 110, or the power management module 141 and the charging management module 140 may be alternatively disposed in the same component.

A wireless communications function of the terminal device 100 may be implemented by using the antenna 1, the antenna 2, the mobile communications module 150, the wireless communications module 160, the modem processor, the baseband processor, and other components.

The antenna 1 and the antenna 2 are configured to transmit and receive electromagnetic wave signals. Each antenna in the terminal device 100 may be configured to cover a single communications frequency band or a plurality of communications frequency bands. Different antennas may also be multiplexed to improve utilization of the antennas. For example, the antenna 1 may be multiplexed into a diversity antenna of a wireless local area network. In some other embodiments, the antenna may be used in combination with a tuning switch.

The terminal device 100 may implement a display function by using the GPU, the display screen 194, and the application processor. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display screen 194 may be configured to display an image or a video. For example, the display screen may display the $N^{th}$ frame of image.

Exemplarily, the display screen 194 may include a display panel. In this embodiment of this application, the display panel may use an organic light-emitting diode (organic light-emitting diode, OLED), an active-matrix organic light-emitting diode (active-matrix organic light-emitting diode, AMOLED), a micro OLED (Micro OLED), or the like.

In some embodiments, the terminal device 100 may include one or N display screens 194, and N is a positive integer greater than 1.

In some embodiments, the processor 110 communicates with the display screen 194 by using a display screen camera serial interface (display serial interface, DSI), to implement a display function of the terminal device 100.

The terminal device 100 may implement a photographing function by using the ISP, the camera 193, the video codec, the GPU, the display screen 194, the application processor, and the like.

The ISP is configured to process data fed back by the camera 193. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may optimize an algorithm for noise, brightness, and color of the image, and optimize parameters, such as exposure and color temperature, of a photographing scene. In some embodiments, the ISP may be disposed in the camera 193.

The camera 193 is configured to capture a still image or a video. An optical image of an object is generated through a lens and is projected to a photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into a standard image signal in red green blue (red green blue, RGB) and YUV formats. In some embodiments, the terminal device 100 may include one or N cameras 193, and N is a positive integer greater than 1.

The digital signal processor is configured to process a digital signal, and may further process another digital signal in addition to a digital image signal. For example, when the terminal device 100 performs frequency channel selection, the digital signal processor is configured to perform Fourier transformation and the like on frequency channel energy.

The video codec is configured to compress or decompress a digital video. The terminal device 100 may support one or more video codecs. In this way, the terminal device 100 may play or record videos in a plurality of encoding formats, for example, moving picture experts group (moving picture experts group, MPEG)1, MPEG2, MPEG3, and MPEG4.

The NPU is a processor referring to a structure of a biological neural network, for example, the NPU quickly processes input information by referring to a transmission mode between neurons in a human brain, and may further continuously perform self-learning. Functions such as intelligent cognition of the terminal device 100, such as image recognition, facial recognition, speech recognition, and text understanding, can be implemented by using the NPU.

The external memory interface 120 may be configured to connect to an external storage card such as a secure digital (secure digital, SD) card, to extend a storage capability of the terminal device 100. The external storage card communicates with the processor 110 by using the external memory interface 120, so as to implement a data storage function, for example, storing a file such as a music or a video in the external storage card.

The internal memory 121 may be configured to store computer-executable program code. The executable program code includes an instruction. The internal memory 121 may include a program storage region and a data storage region. The program storage region may store an operating system, an application required by at least one function (such as a voice playing function and an image playing function). The data storage region may store data (such as audio data and an address book) created during use of the terminal device 100. In addition, the internal memory 121 may include a high-speed random access memory, and may also include a non-volatile memory, for example, at least one magnetic disk storage device, a flash memory device, a universal flash storage (universal flash storage, UFS), or the like. The processor 110 executes various processing methods of the terminal device 100 by running an instruction stored in the internal memory 121 and/or an instruction stored in the memory disposed in the processor.

The terminal device 100 may implement an audio function, for example, music playback or recording, by using the audio module 170, the speaker 170A, the phone receiver 170B, the microphone 170C, the headset jack 170D, the application processor, and the like.

The button 190 includes a power button and a volume button. The key 190 may be a mechanical key, or a touch-type key. The terminal device 100 may receive a key input signal, and implement a function related to the key input signal.

The indicator 192 may be an indicator light, may be configured to indicate a charging state and a battery change, and may be further configured to indicate a message, a missed call, and a notification.

It should be noted that, the structure shown in FIG. 1 does not constitute a specific limitation on the terminal device 100. In some other embodiments of this application, the terminal device 100 may include more or less components than those shown in FIG. 1, or the terminal device 100 may include a combination of some of the components shown in FIG. 1, or the terminal device 100 may include subcomponents of some of the components shown in FIG. 1. The components shown in FIG. 1 may be implemented by hardware, software, or a combination of software and hardware.

Because the display screen of the terminal device shown in FIG. 1 may include the display panel, each pixel may correspond to a pixel driving circuit, and the pixel driving circuit may display different pixel points. The following describes a working principle of the pixel driving circuit with reference to FIG. 2.

Figure 2:
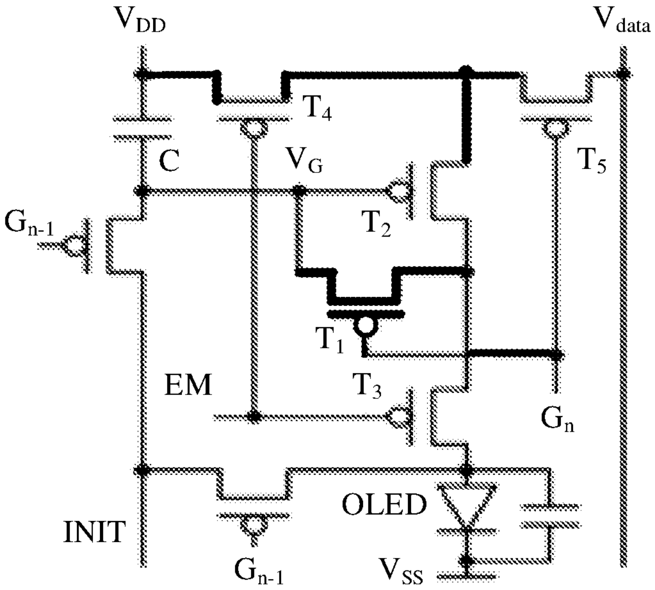
FIG. 2 is a schematic diagram of a 7T1C pixel driving circuit applicable to this application.

FIG. 2 is a schematic diagram of a 7T1C pixel driving circuit applicable to this application.

It should be understood that, a method for adjusting a drive voltage of a display assembly in this embodiment of this application is applicable to any pixel driving circuit. By using the 7T1C pixel driving circuit as an example, a working principle of the 7T1C pixel driving circuit is described herein.

As shown in FIG. 2, the 7T1C pixel driving circuit may include seven thin film transistors and one capacitor, where the seven thin film transistors include: $T_1$, $T_2$, $T_3$, $T_4$, $T_5$, and two $G_{n-1}$ thin film transistors; $V_{DD}$ represents a working voltage inside a component; $V_{data}$ represents a data voltage; INIT represents initialization, so that the capacitor reaches a fixed level value; $V_{SS}$ represents a drive voltage (such as, a supply voltage); and EM represents a control signal, and EM is used for controlling an on or off state of the thin film transistor $T_3$ or $T_4$. It should be noted that, working states of $T_3$ and $T_4$ controlled by EM only have two working states: the on state and the off state, and a duty ratio of EM is controlled, so that display brightness can be adjusted. $T_1$ is configured to control a turn-on current. The two $G_{n-1}$ are configured to reset pixel gray scale content, for example, clear gray scale information of a previous frame of image.

According to the $7T_1C$ pixel driving circuit shown in FIG. 2, the $T_2$ thin film transistor (an example of a first thin film transistor) may be configured to provide a drive current for a light-emitting body (such as, an OLED). For example, the drive current of the light-emitting body is controlled by adjusting the conduction of the $T_2$ thin film transistor, and then gray scales of pixels in an image can be controlled by controlling the current of the light-emitting body. Under certain brightness, for an image, it is necessary to ensure that a gray scale of each pixel can be represented on the light-emitting body, that is, the current of the light-emitting body needs to meet currents required by gray scales of all pixels. Therefore, a voltage difference between $V_{DD}$ and $V_{SS}$ needs to meet a voltage required when the light-emitting body displays the gray scales of all the pixels.

It should be understood that, the gray scale refers to dividing a brightness change between brightest brightness and darkest brightness into several parts, so that screen brightness can be controlled by an input signal. For example, one frame of image may be formed by a plurality of pixels, usually each pixel may present many different colors, which is formed by three sub-pixels of red, green, and blue (RGB); a light source behind each sub-pixel may show different brightness levels, and gray scales may represent levels of different brightness from the darkest to the brightest; and more levels of gray scales indicate a more delicate picture effect that can be presented.

It should be further understood that, the above light-emitting body may be a light-emitting diode, for example, the light-emitting body may be the OLED, or another light-emitting diode. This is not limited in this application.

Currently, a fixed drive voltage is usually provided for an active light-emitting display assembly. For example, if the pixel driving circuit uses a working manner of a fixed voltage, the fixed voltage meets a requirement for maximum brightness of pixels, that is, meets a highest gray scale of brightness (for example, a highest gray scale of a display assembly of 8-bit color depth is 255; and a highest gray scale of a display assembly of 10-bit color depth is 1023). However, content displayed in the active light-emitting display assembly changes dynamically, and not all display content appear at the highest gray scale of the brightness. By using the working manner of the fixed voltage, the power consumption of the active light-emitting display assembly is relatively large.

In view of this, this application provides a method for adjusting a drive voltage of a display assembly. In this embodiment of this application, a drive voltage required when the display assembly displays an $N^{th}$ frame of image is determined according to a highest gray scale of the $N^{th}$ frame of image, and the drive voltage of the display assembly is dynamically adjusted according to the drive voltage required when displaying the $N^{th}$ frame of image. In this way, in a case of ensuring a normal display of the image, the drive voltage of the display assembly is reduced, so as to reduce the power consumption of the display assembly.

Figure 3:
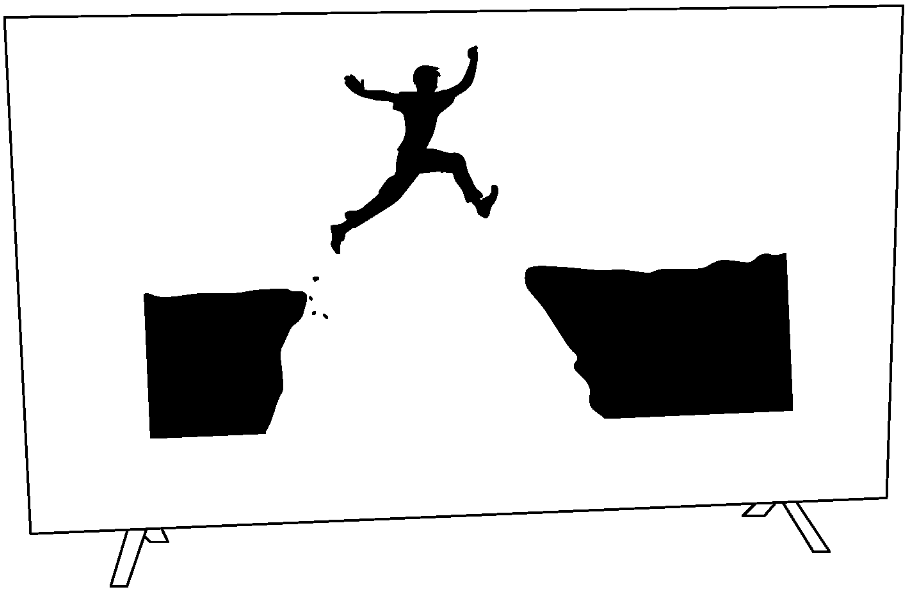
FIG. 3 is a schematic diagram of an application scenario applicable to an embodiment of this application.

In an example, the method for adjusting a drive voltage of a display assembly in this embodiment of this application may be applied to a smart screen, as shown in FIG. 3. Through the method of this application, a drive voltage required when the smart screen displays one frame of image may be determined according to a highest gray scale of the one frame of image, and a drive voltage of the smart screen may be dynamically adjusted according to the drive voltage required when the smart screen displays the one frame of image, so that a problem of relatively large power consumption when a constant voltage is used is avoided. Through the method in this embodiment of this application, in a case that the smart screen can normally display, the drive voltage is reduced, so as to reduce the power consumption of the smart screen.

Figure 4:
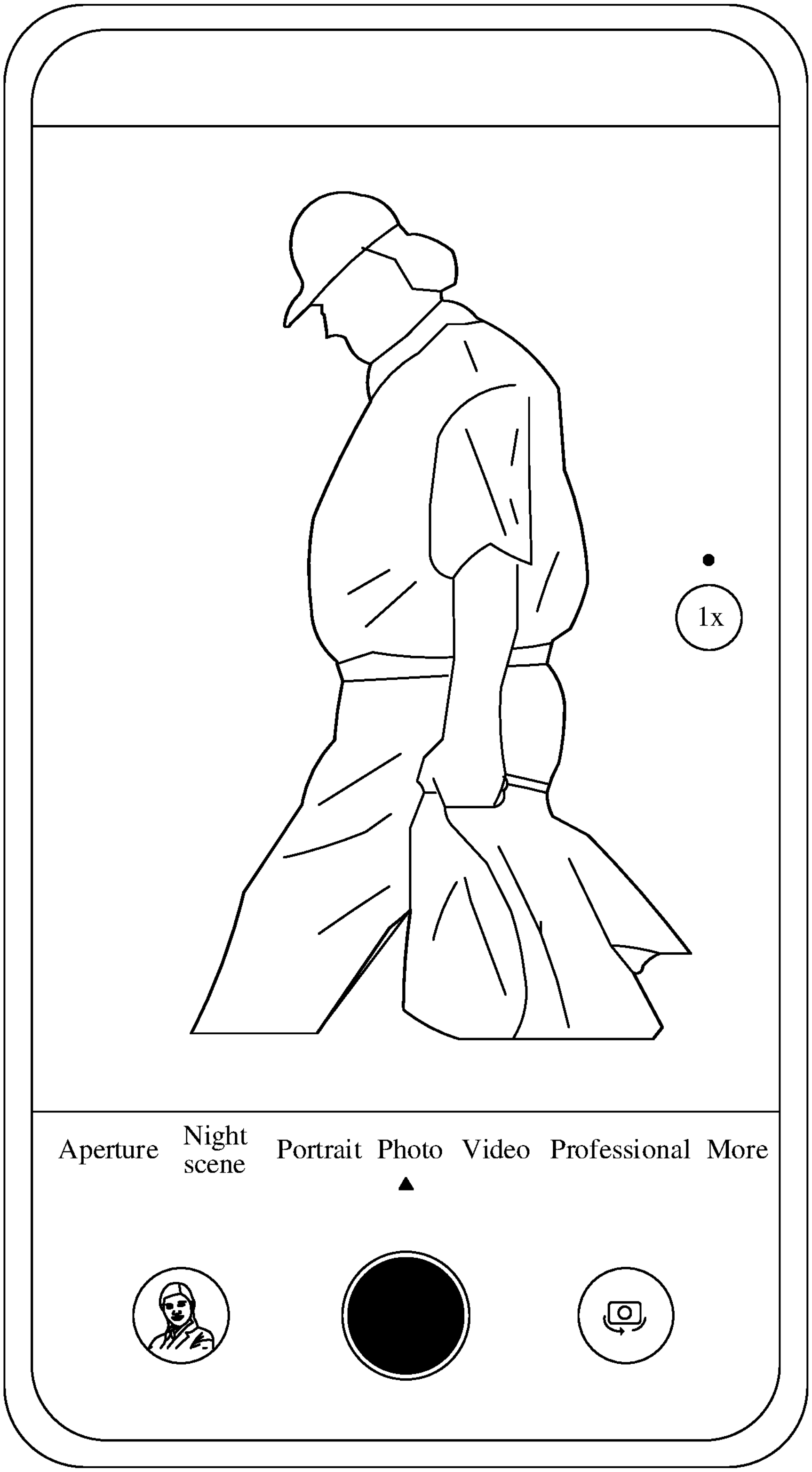
FIG. 4 is a schematic diagram of an application scenario applicable to an embodiment of this application.

In an example, the method for adjusting a drive voltage of a display assembly in this embodiment of this application may be applied to a mobile phone, as shown in FIG. 4. Through the method of this application, a drive voltage required when a display assembly in the mobile phone displays one frame of image may be determined according to a highest gray scale of the one frame of image, and a drive voltage of the display assembly in the mobile phone may be dynamically adjusted according to the drive voltage required when the display assembly in the mobile phone displays the one frame of image, so that a problem of relatively large power consumption when a constant voltage is used is avoided. Through the method in this embodiment of this application, in a case that the mobile phone can normally display, the drive voltage of the display assembly in the mobile phone is reduced, so as to reduce the power consumption of the display assembly in the mobile phone.

It should be understood that, the above are examples of application scenarios, and do not limit the application scenarios of this application. The method provided in this embodiment of this application may be applicable to any terminal device that displays through a pixel driving circuit.

Figure 5:
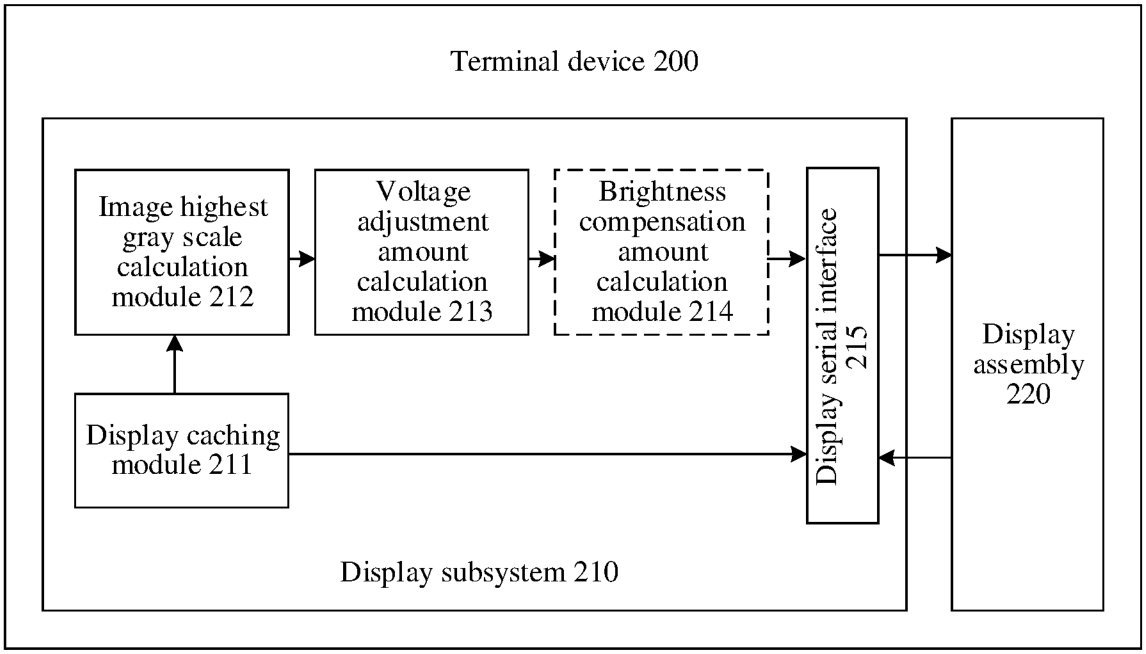
FIG. 5 is a schematic diagram of a system architecture applicable to an embodiment of this application.

FIG. 5 is a schematic diagram of an architecture of a system for adjusting a drive voltage of a display assembly applicable to an embodiment of this application.

As shown in FIG. 5, a terminal device 200 may include a display subsystem 210 and a display assembly 220. The display subsystem 210 may include a display caching module 211, an image highest gray scale calculation module 212, a voltage adjustment amount calculation module 213, and a display serial interface (display serial interface, DSI) 215.

Optionally, the display subsystem 210 may further include a brightness compensation amount calculation module 214.

Exemplarily, the display assembly 220 is an active light-emitting display assembly; the active light-emitting display assembly may include a display panel and a printed circuit board (printed circuit board, PCB); and the PCB includes a pixel driving circuit, and the display assembly 220 drives image data to be displayed on the display panel by using the pixel driving circuit.

For example, the display panel included by the active light-emitting display assembly may use any one of an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini light-emitting diode (mini light-emitting diode, Mini LED), a micro light-emitting diode (micro light-emitting diode, Micro LED), a micro OLED (Micro OLED), or a quantum dot light-emitting diode (quantum dot light emitting diodes, QLED).

Optionally, the image highest gray scale calculation module 212, the voltage adjustment amount calculation module 213, and the brightness compensation amount calculation module 214 may be integrated on a system on chip (system on chip, SOC) of the terminal device 200.

Optionally, the image highest gray scale calculation module 212, the voltage adjustment amount calculation module 213, and the brightness compensation amount calculation module 214 may be modules in example hardware of the terminal device 200, for example, may be modules in a central processing unit (central processing unit, CPU) or a digital signal processor (digital signal processor, DSP).

Exemplarily, the display caching module 211 is configured to store image or video data. The image highest gray scale calculation module 212 is configured to count a highest gray scale of one frame of image, where the highest gray scale is a maximum value of gray scales corresponding to all pixels included in the one frame of image. The voltage adjustment amount calculation module 213 is configured to calculate an adjustment amount of a drive voltage. For example, a drive voltage required by the one frame of image may be determined according to the highest gray scale of the one frame of image, and $V_{SS}$ is adjusted according to a required minimum voltage, so that a voltage difference between $V_{SS}$ and $V_{DD}$ is minimized, so as to reduce the power consumption.

It should be understood that, drive voltages ($V_{SS}$) are the same for the one frame of image. To ensure a normal display of all pixels in the one frame of image, a drive current required by the one frame of image may be determined according to the highest gray scale of the one frame of image. The drive voltage required by the one frame of image may be determined according to the required drive current, and the drive voltage may be a voltage difference between the working voltage ($V_{DD}$) and the drive voltage ($V_{SS}$) shown in FIG. 1.

Optionally, the display subsystem 210 may further include the brightness compensation amount calculation module 214, and the brightness compensation amount calculation module 214 is configured to calculate a brightness compensation value. In a case that an output current in a saturation region of an output characteristic curve of a $T_2$ thin film transistor has a certain change with the voltage difference, compensation may be performed through a brightness value, so as to make up for a problem in which a horizontal axis of the output characteristic curve of the $T_2$ thin film transistor is not parallel to an X axis, as shown in FIG. 6.

Optionally, in a possible implementation, if the $T_2$ thin film transistor is in an ideal state, that is, currents outputted when the $T_2$ thin film transistor is in the saturation region are completely the same, or when a user cannot identify in a case that a drive current corresponding to a voltage adjustment amount meets a specific threshold, the display subsystem 210 may not include the brightness compensation amount calculation module 214.

Figure 6:
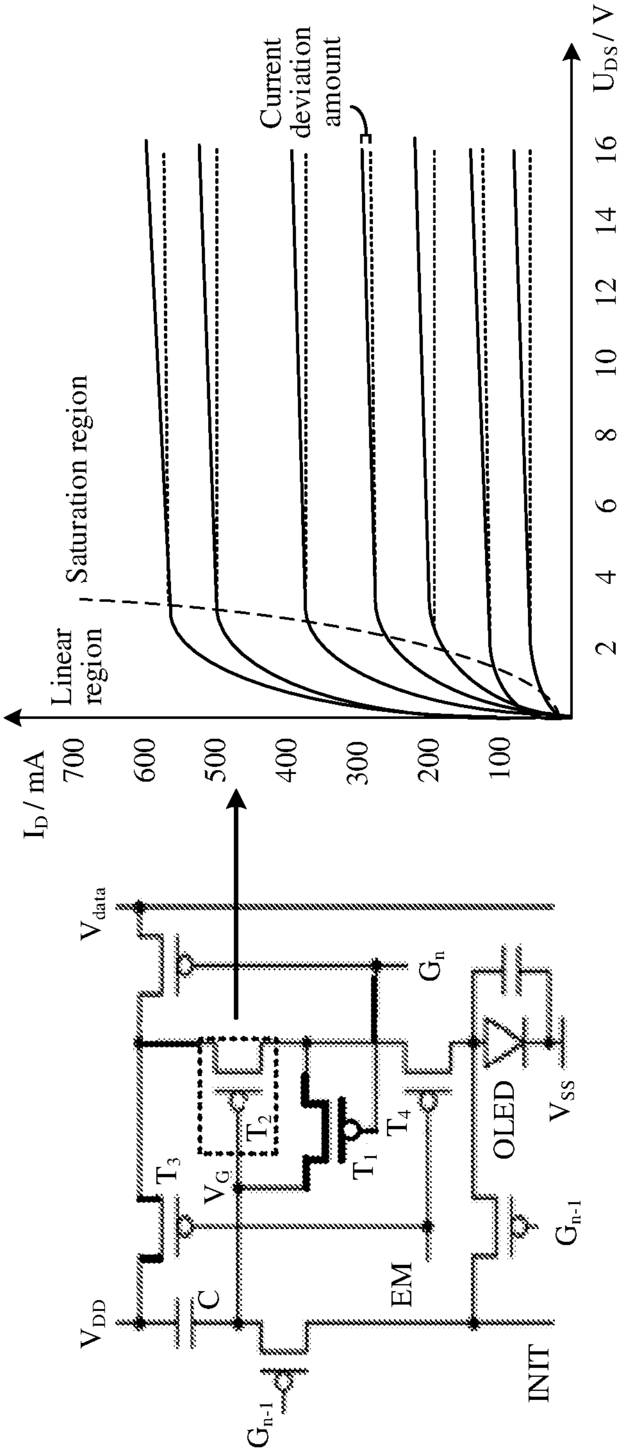
FIG. 6 is a schematic diagram of an output characteristic curve of a thin film transistor.

FIG. 6 is a schematic diagram of an output characteristic curve of a thin film transistor. The output characteristic curve may be an output characteristic curve of the $T_2$ thin film transistor shown in FIG. 1.

As shown in FIG. 6, EM is used for controlling working states of a $T_3$ thin film transistor and a $T_4$ thin film transistor, and when the $T_3$ thin film transistor and the $T_4$ thin film transistor are turned on, a voltage difference between the $T_3$ thin film transistor and the $T_4$ thin film transistor is approximately 0; $V_{DD}-V_{SS}-U_{DS}=V_{OLED}$, a current required by an OLED may be determined according to a highest gray scale of one frame of image, and a working voltage $V_{OLED}$ of the OLED may be determined because the voltage of the OLED is proportional to the current; in the output characteristic curve of the $T_2$ thin film transistor, a horizontal axis Ups represents a voltage difference between a drain (drain) and a source (source), and a vertical axis ID represents a current of the drain (drain); and it can be seen from FIG. 6 that, in a linear region, there is a linear relationship between Ups and ID, and in a saturation region, Ups changes, while ID does not change basically. The $T_2$ thin film transistor is configured to control a drive current of a light-emitting body (such as, the OLED). Therefore, when the $T_2$ thin film transistor is in the saturation region, in a case of ensuring that a provided drive current meets a minimum current required by the light-emitting body (such as, the OLED), Ups, namely, the voltage difference between the drain and the source of the $T_2$ thin film transistor, may be reduced. For example, when it is ensured that the drive current meets the highest gray scale of the one frame of image, $U_{DS}$ may be selected as a critical point between the linear region and the saturation region; in a case that the drive current does not change, because $V_{DD}-V_{SS}-U_{DS}=V_{OLED}$, and $V_{OLED}$ is determined according to the drive current, smaller $U_{DS}$ indicates smaller $V_{DD}-V_{SS}$; and because $V_{DD}$ usually remains unchanged and $V_{SS}$ is a negative voltage value, smaller $V_{DD}-V_{SS}$ indicates a smaller absolute value of the drive voltage $V_{SS}$, so that the drive voltage of the display assembly can be reduced, so as to effectively reduce the power consumption of the display assembly.

Exemplarily, a brightness compensation amount is described in detail with reference to FIG. 6. As shown in FIG. 6, in the ideal state, currents outputted when the $T_2$ thin film transistor is in the saturation region are completely the same, as shown by a dash line of the saturation region in FIG. 6. However, affected by some factors in actual situations, the currents outputted when the $T_2$ thin film transistor is in the saturation region may have some slight differences, as shown by current deviation amounts in FIG. 6. Brightness compensation amounts may compensate the current deviation amounts of the currents in the saturation region.

It should be understood that, because there is an association relationship between a current and brightness and the displayed brightness may be changed by changing the current, brightness compensation may be performed on a displayed image through a brightness compensation amount, so as to make up for the problem in which the horizontal axis of the output characteristic curve of the $T_2$ thin film transistor in the saturation region is not parallel to the X axis.

In this embodiment of this application, a drive voltage ($V_{SS}$) is adjusted, so that a voltage difference between a working voltage ($V_{DD}$) and the drive voltage can be adjusted; because the voltage difference between the working voltage and the drive voltage changes, voltages on two ends of a capacitor C change; and through the voltages on the capacitor C, a turn-on degree of a $T_2$ thin film transistor may be controlled, so as to control a drive current of a light-emitting body (such as, an OLED). For example, a minimum current required by the light-emitting body (such as, the OLED) may be determined according to a highest gray scale of one frame of image, a minimum voltage difference between a drain and a source may be obtained according to the minimum current and an output characteristic curve of the $T_2$ thin film transistor, a minimum voltage difference required between the working voltage and the drive voltage may be determined according to the minimum voltage difference, and then a required minimum drive voltage may be determined. In this way, when a normal display of the image is ensured, that is, in a case that the drive voltage can meet the minimum current required by the light-emitting body (such as, the OLED), the drive voltage can be reduced, so as to reduce the power consumption of a display assembly.

With reference to FIG. 7A and FIG. 7B to FIG. 10, the method for adjusting a drive voltage of a display assembly provided in the embodiments of this application is described below in detail.

Implementation 1

In an example, a drive voltage required when a display assembly displays one frame of image may be determined according to a highest gray scale of the one frame of image, so as to adjust a drive voltage of a pixel driving circuit. In a case that a current outputted when an output characteristic curve of a $T_2$ thin film transistor is in a saturation region has a certain change with a voltage difference, brightness compensation may be performed on an image displayed by the display assembly through a brightness compensation amount.

Figure 7A:
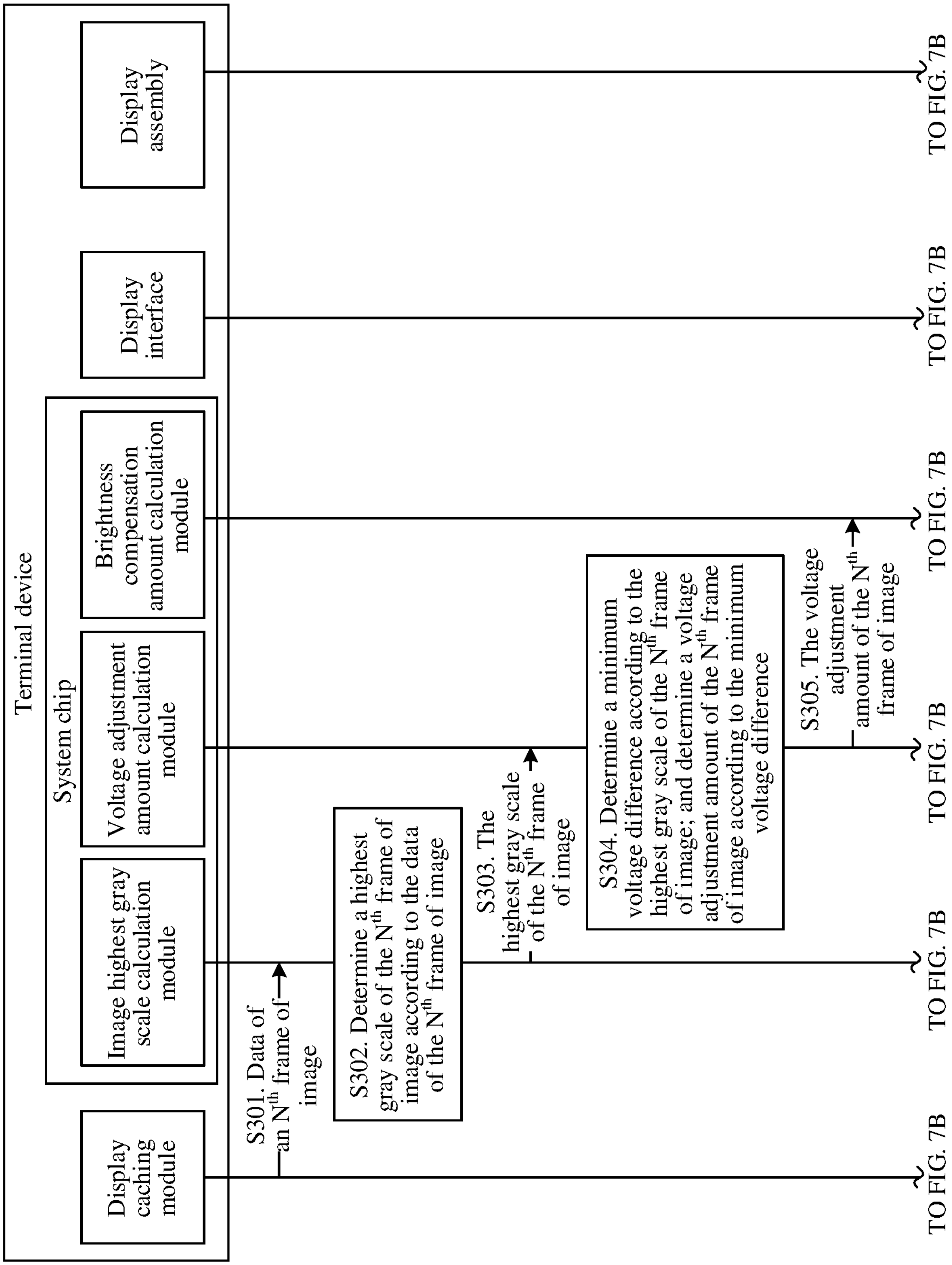
FIG. 7A and FIG. 7B show a method for adjusting a drive voltage of a display assembly according to an embodiment of this application.
Figure 7B:
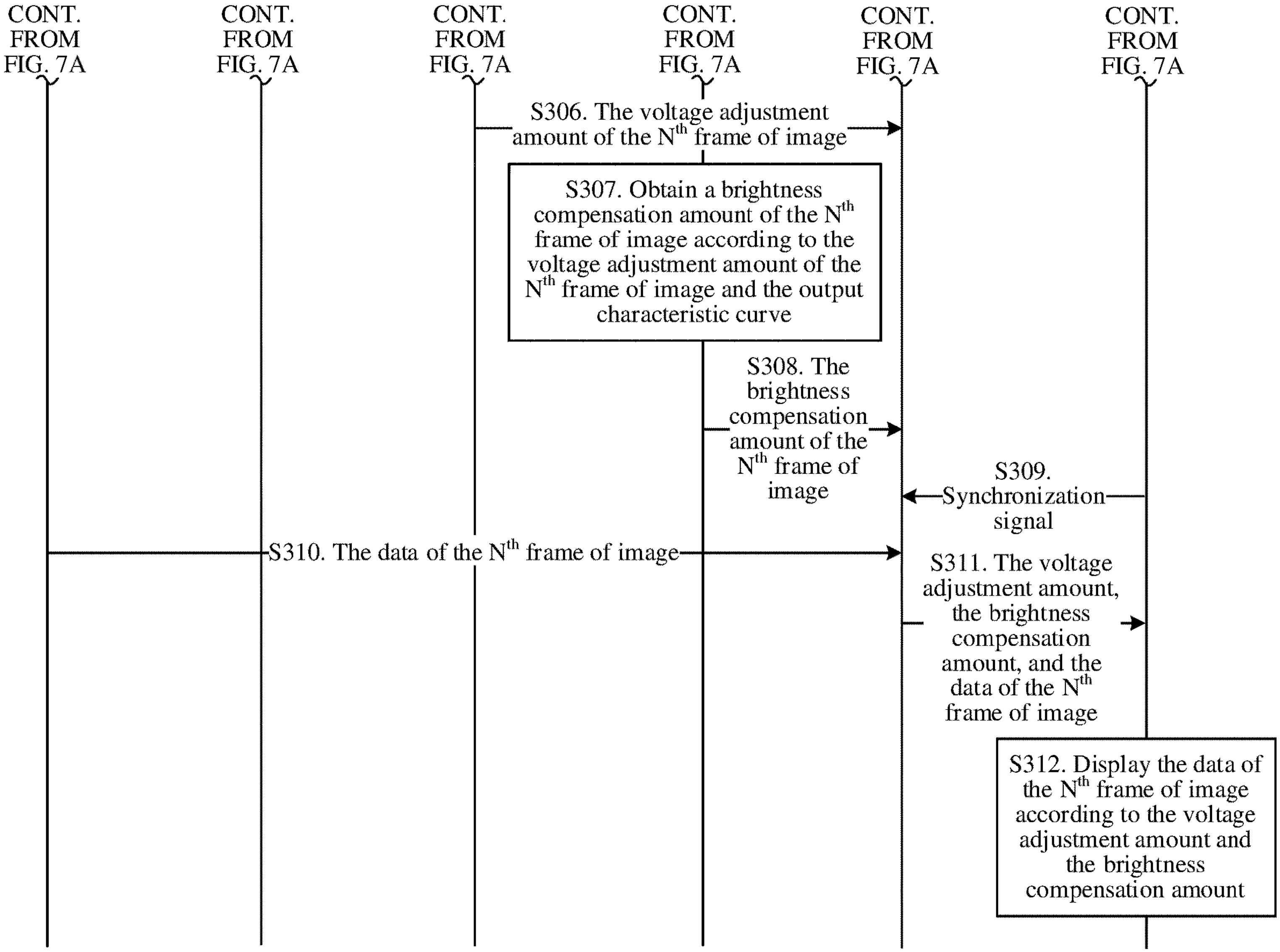

FIG. 7A and FIG. 7B show detailed description for a method for adjusting a drive voltage of a display assembly according to an embodiment of this application. As shown in FIG. 7A and FIG. 7B, the method includes step S301 to step S312. Step S301 to step S312 are respectively described below in detail.

Step S301. A display caching module sends data of an $N^{th}$ frame of image to an image highest gray scale calculation module.

N is a positive integer.

Exemplarily, a graphics processing unit, a video decoder (video decoder), a component (video processing unit, VPU) connected to the display assembly, or the like may write image data into the display caching module.

It should be understood that, the data of the $N^{th}$ frame of image may be data of a current frame of image written into the display caching module, that is, the data of the $N^{th}$ frame of image is data of a to-be-displayed frame of image. Optionally, when the display caching module writes new image data, the display caching module may actively send the image data to the image highest gray scale calculation module.

Optionally, when the display caching module receives an instruction, the display caching module may send the data of the $N^{th}$ frame of image to the image highest gray scale calculation module. For example, after the display caching module receives an image data invoking instruction sent by the image highest gray scale calculation module, the display caching module may send the newly written image data to the image highest gray scale calculation module.

Step S302. The image highest gray scale calculation module determines a highest gray scale of the $N^{th}$ frame of image according to the data of the $N^{th}$ frame of image.

Exemplarily, the display caching module stores data of a plurality of frames of images. The image highest gray scale calculation module may obtain data of an image from the display caching module according to a computing capability; and determine a highest gray scale of the image according to the data of the image. Exemplarily, the highest gray scale of the $N^{th}$ frame of image may be obtained by identifying a histogram of the $N^{th}$ frame of image.

For example, for a display assembly of 8-bit color depth, an ideal gray scale range is 0 to 255; and for the $N^{th}$ frame of image, the highest gray scale of the $N^{th}$ frame of image may be determined as 230 according to the histogram of the $N^{th}$ frame of image.

For example, for a display assembly of 10-bit color depth, an ideal gray scale range is 0 to 1023; and for the $N^{th}$ frame of image, the highest gray scale of the $N^{th}$ frame of image may be determined as 900 according to the histogram of the $N^{th}$ frame of image.

Exemplarily, the highest gray scale of the $N^{th}$ frame of image may be determined by traversing each pixel point in the $N^{th}$ frame of image.

Exemplarily, the highest gray scale of the $N^{th}$ frame of image may be outputted by a previous component connected to the display caching module; and the previous component connected to the display assembly may be a GPU, a video decoder (video decoder), a component (video processing unit, VPU) connected to the display assembly, or the like.

Step S303. The image highest gray scale calculation module sends the highest gray scale of the $N^{th}$ frame of image to a voltage adjustment amount calculation module.

Step S304. The voltage adjustment amount calculation module may determine a minimum voltage difference according to the highest gray scale of the $N^{th}$ frame of image; and determine a voltage adjustment amount of the $N^{th}$ frame of image according to the minimum voltage difference.

Exemplarily, the voltage adjustment amount calculation module may determine a minimum current required by a light-emitting body (such as, a light-emitting diode) in a pixel driving circuit according to the highest gray scale of the $N^{th}$ frame of image; because a working voltage of the light-emitting body is proportional to a working current, a minimum voltage difference between a drain and a source may be determined according to the minimum current required by the light-emitting body and an output characteristic curve of a $T_2$ thin film transistor; and a minimum voltage difference between a working voltage ($V_{DD}$) of the pixel driving circuit and a drive voltage ($V_{SS}$) may be determined according to the minimum voltage difference between the drain and the source, so as to determine the voltage adjustment amount of the $N^{th}$ frame of image.

For example, as shown in FIG. 6, EM is used for controlling working states of a $T_3$ thin film transistor and a $T_4$ thin film transistor, and when the $T_3$ thin film transistor and the $T_4$ thin film transistor are turned on, a voltage difference between the $T_3$ thin film transistor and the $T_4$ thin film transistor is approximately 0, and then $V_{DD}-V_{SS}-U_{DS}=V_{OLED}$; the minimum current required by the light-emitting body (such as, an OLED) may be determined according to the highest gray scale of the $N^{th}$ frame of image, and a working voltage $V_{OLED}$ of the light-emitting body may be determined because the voltage of the light-emitting body is proportional to the current; according to the output characteristic curve of the $T_2$ thin film transistor, when it is ensured that the drive current meets the highest gray scale of the $N^{th}$ frame of image, $U_{DS}$ of the $T_2$ thin film transistor may be selected as a critical point between a linear region and a saturation region; because $V_{DD}-V_{SS}-U_{DS}=V_{OLED}$, $V_{DD}-V_{SS}$ may be obtained in a case that Ups and $V_{OLED}$ are determined; and $V_{DD}$ usually does not change, so that $V_{SS}$, namely, the voltage adjustment amount of the $N^{th}$ frame of image, can be determined.

It should be understood that, a drive current in the saturation region of the output characteristic curve of the $T_2$ thin film transistor does not change, and because $V_{DD}-V_{SS}-U_{DS}=V_{OLED}$, and $V_{OLED}$ is determined according to the drive current, smaller Ups indicates smaller $V_{DD}-V_{SS}$; and because $V_{DD}$ usually remains unchanged and $V_{SS}$ is a negative voltage value, smaller $V_{DD}-V_{SS}$ indicates a smaller absolute value of the drive voltage $V_{SS}$, so that the drive voltage of the display assembly can be reduced, so as to effectively reduce the power consumption of the display assembly.

Optionally, in a possible implementation, the voltage adjustment amount of the $N^{th}$ frame of image may be an absolute value of a drive voltage when the display assembly displays the $N^{th}$ frame of image.

Optionally, in a possible implementation, the voltage adjustment amount of the $N^{th}$ frame of image may be a voltage difference relative to a drive voltage (an example of a first drive voltage) of an $(N-1)^{th}$ frame of image.

It should be understood that, because one frame of image corresponds to one drive voltage, that is, a plurality of pixel driving circuits included in one frame of image share one drive voltage, it is necessarily ensured that the drive voltage enables that a highest gray scale in one frame of image can be normally displayed. In this embodiment of this application, a value of a drive voltage required when a display assembly displays an $N^{th}$ frame of image, namely, a minimum voltage required when displaying the $N^{th}$ frame of image, may be determined through a highest gray scale of the $N^{th}$ frame of image. Under a condition of the same brightness, the highest gray scale of the $N^{th}$ frame of image determines a minimum voltage difference between a working voltage of a pixel driving circuit and the drive voltage. The working voltage usually does not change, and the drive voltage is adjusted so that the minimum voltage difference required when the display assembly displays the $N^{th}$ frame of image is met.

Step S305. The voltage adjustment amount calculation module sends the voltage adjustment amount of the $N^{th}$ frame of image to a brightness compensation amount calculation module.

Step S306. The voltage adjustment amount calculation module sends the voltage adjustment amount of the $N^{th}$ frame of image to a display interface.

Step S307. The brightness compensation amount calculation module obtains a brightness compensation amount of the $N^{th}$ frame of image according to the voltage adjustment amount of the $N^{th}$ frame of image and the output image curve.

For example, the brightness compensation amount calculation module may determine the brightness compensation amount of the $N^{th}$ frame of image according to the voltage adjustment amount of the $N^{th}$ frame of image and an output characteristic curve of a transistor, where the transistor is a transistor configured to provide the drive current for the light-emitting body in the pixel driving circuit, for example, the $T_2$ thin film transistor shown in FIG. 2.

It should be understood that, in this embodiment of this application, the thin film transistor configured to provide the drive current for the light-emitting body (such as, the OLED) in the pixel driving circuit may always work in the saturation region, that is, when the display assembly displays the highest gray scale and a lowest gray scale of the $N^{th}$ frame of image, the thin film transistor configured to provide the drive current for the light-emitting body may always work in the saturation region of the output characteristic curve; and the thin film transistor outputs different drain currents, so that the light-emitting body displays different brightness.

It should be noted that, an essence of the brightness compensation amount may be regarded as a current compensation amount. Because the brightness and the current are strongly correlated, as shown in FIG. 6, because the output characteristic curve of the $T_2$ thin film transistor cannot fully reach the ideal state in the saturation region, the current needs to be compensated so that a horizontal axis of the output characteristic curve is parallel to an X axis. Through the brightness compensation amount, the brightness of the displayed image can reach a brightness effect corresponding to an output current of the saturation region in the ideal state.

Exemplarily, the output characteristic curve shown in FIG. 6 may determine a slope (an example of a first slope) of the curve in the saturation region, and may determine $\Delta U$ according to the voltage adjustment amount; and may obtain $\Delta I$ according to the slope of the output characteristic curve in the saturation region and $\Delta U$, and may obtain the brightness compensation amount according to $\Delta I$.

Step S308. The brightness compensation amount calculation module sends the brightness compensation amount of the $N^{th}$ frame of image to the display interface.

Step S309. The display assembly sends a synchronization signal to the display interface.

Exemplarily, the synchronization signal may be used for indicating that the display assembly starts to display the $N^{th}$ frame of image.

Step S310. The display caching module sends the data of the $N^{th}$ frame of image to the display interface.

For example, the display interface may obtain the data of the $N^{th}$ frame of image from the display caching module after receiving the synchronization signal.

Step S311. The display interface sends the voltage adjustment amount, the brightness compensation amount, and the data of the $N^{th}$ frame of image to the display assembly.

Exemplarily, the display interface sends the voltage adjustment amount of the $N^{th}$ frame of image, the brightness compensation amount of the $N^{th}$ frame of image, and the data of the $N^{th}$ frame of image to the display assembly.

Optionally, the voltage adjustment amount of the $N^{th}$ frame of image may be the absolute value of the drive voltage when the display assembly displays the $N^{th}$ frame of image.

Optionally, the voltage adjustment amount of the $N^{th}$ frame of image may be the voltage difference relative to the drive voltage of the $(N-1)^{th}$ frame of image.

For example, the voltage difference may be a voltage difference between the drive voltage when displaying the $(N-1)^{th}$ frame of image and the drive voltage of the $N^{th}$ frame of image.

Situation 1: The Display Assembly is a Display Assembly without a Cache Region.

In an example, when the display assembly has no cache region, the display assembly cannot cache the data of the $N^{th}$ frame of image. Therefore, after receiving the synchronization signal, the display interface may first send the voltage adjustment amount of the $N^{th}$ frame of image and the brightness compensation amount of the $N^{th}$ frame of image to the display assembly, and then send the data of the $N^{th}$ frame of image to the display assembly.

Situation 2: The Display Assembly is a Display Assembly with One Cache Region.

In an example, when the display assembly has one cache region, the display assembly may be configured to cache data of next frame of image of a current frame of image, and then, after receiving a synchronization instruction, the display interface may simultaneously send the voltage adjustment amount of the $N^{th}$ frame of image, the brightness compensation amount of the $N^{th}$ frame of image, and the data of the $N^{th}$ frame of image; or, may first send the data of the $N^{th}$ frame of image, and then send the voltage adjustment amount of the $N^{th}$ frame of image and the brightness compensation amount of the $N^{th}$ frame of image.

Situation 3: The Display Assembly is a Display Assembly with a Plurality of Cache Regions.

In an example, when the display assembly has the plurality of cache regions, the display interface needs to mark when sending a voltage adjustment amount, a brightness compensation amount, and data of an image to the display assembly, that is, one frame of image and a group of a voltage adjustment amount and a brightness compensation amount corresponding to the one frame of image are marked.

It should be understood that, the voltage adjustment amount and the brightness compensation amount are related to a highest gray scale in the image; and for different images, if highest gray scales in the images are different, voltage adjustment amounts and brightness compensation amounts may be different.

Step S312. The display assembly displays the data of the $N^{th}$ frame of image according to the voltage adjustment amount and the brightness compensation amount.

For example, the display assembly may perform settings according to the voltage adjustment amount of the $N^{th}$ frame of image and the brightness compensation amount of the $N^{th}$ frame of image, and then display the data of the $N^{th}$ frame of image.

It should be understood that, the drive voltage of the display assembly may be $V_{SS}$ in the pixel driving circuit shown in FIG. 2. Because the $T_2$ thin film transistor works in the saturation region, the drive current provided by the $T_2$ thin film transistor for the light-emitting body does not change with the voltage difference, that is, adjusting the drive voltage has less effect on the drive current of the light-emitting body (such as, the OLED). In addition, because an adjustment speed can reach more than 60 frames, the image displayed by the display assembly does not have a problem of flickering.

In this embodiment of this application, a voltage required when a display assembly displays an $N^{th}$ frame of image may be determined according to a highest gray scale of the $N^{th}$ frame of image; and a drive voltage of the display assembly is adjusted according to the voltage required when displaying the $N^{th}$ frame of image, so that the drive voltage can be reduced when a normal display of the image is ensured, so as to reduce the power consumption of the display assembly. In addition, a brightness compensation amount may be determined according to the voltage required by the $N^{th}$ frame of image and an output characteristic curve of a drive transistor (such as, a transistor configured to provide a drive current for a light-emitting body) in a pixel driving circuit, so as to perform brightness compensation on the $N^{th}$ frame of image.

Optionally, in an example, if a system chip shown in FIG. 7A and FIG. 7B may include a central processing unit, an image highest gray scale calculation module, a voltage adjustment amount calculation module, and a brightness compensation amount calculation module may be modules in the central processing unit; and the central processing unit may execute step S302 to step S308.

Optionally, in an example, if a system chip shown in FIG. 7A and FIG. 7B may include a central processing unit and a graphics processing unit, an image highest gray scale calculation module, a voltage adjustment amount calculation module, and a brightness compensation amount calculation module may be modules in the graphics processing unit; the central processing unit obtains data of an $N^{th}$ frame of image from a display caching module and sends the data of the $N^{th}$ frame of image to the graphics processing unit, and the graphics processing unit may execute step S302, step S303, step S305, and step S308; the graphics processing unit sends a voltage adjustment amount of the $N^{th}$ frame of image and a brightness compensation amount of the $N^{th}$ frame of image to the central processing unit; and the central processing unit sends the voltage adjustment amount of the $N^{th}$ frame of image and the brightness compensation amount of the $N^{th}$ frame of image to a display interface. Optionally, in an example, if a system chip shown in FIG. 7A and FIG. 7B may include a central processing unit and a graphics processing unit, the graphics processing unit may include an image highest gray scale calculation module, the central processing unit may include a voltage adjustment amount calculation module and a brightness compensation amount calculation module, and the central processing unit may interact with the graphics processing unit to complete step S302 to step S308, as shown in FIG. 8A and FIG. 8B.

It should be noted that, the above graphics processing unit may also be another processor configured to compute, such as a digital signal processor. This is not limited in this application.

Figure 8A:
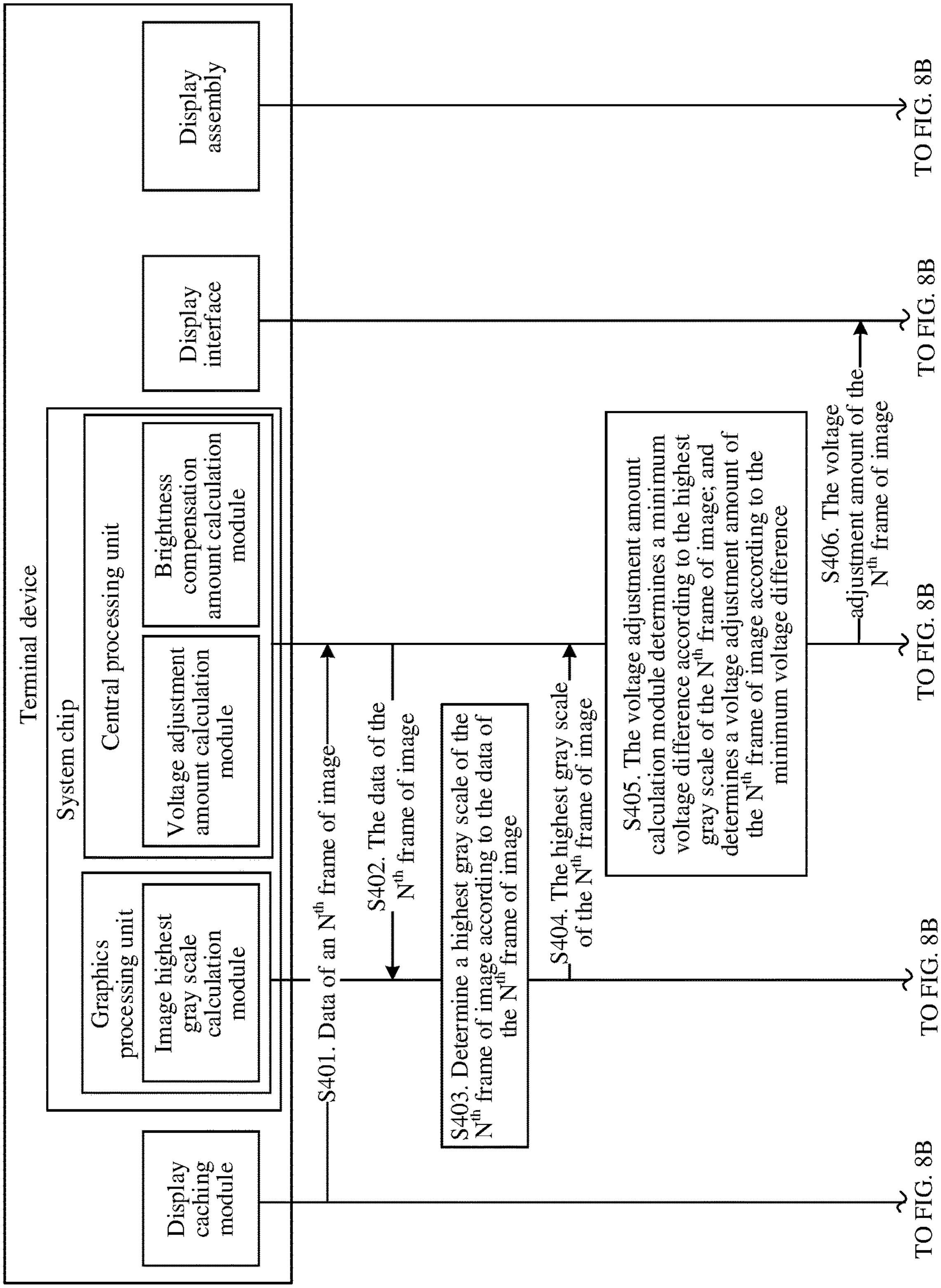
FIG. 8A and FIG. 8B show a method for adjusting a drive voltage of a display assembly according to an embodiment of this application.
Figure 8B:
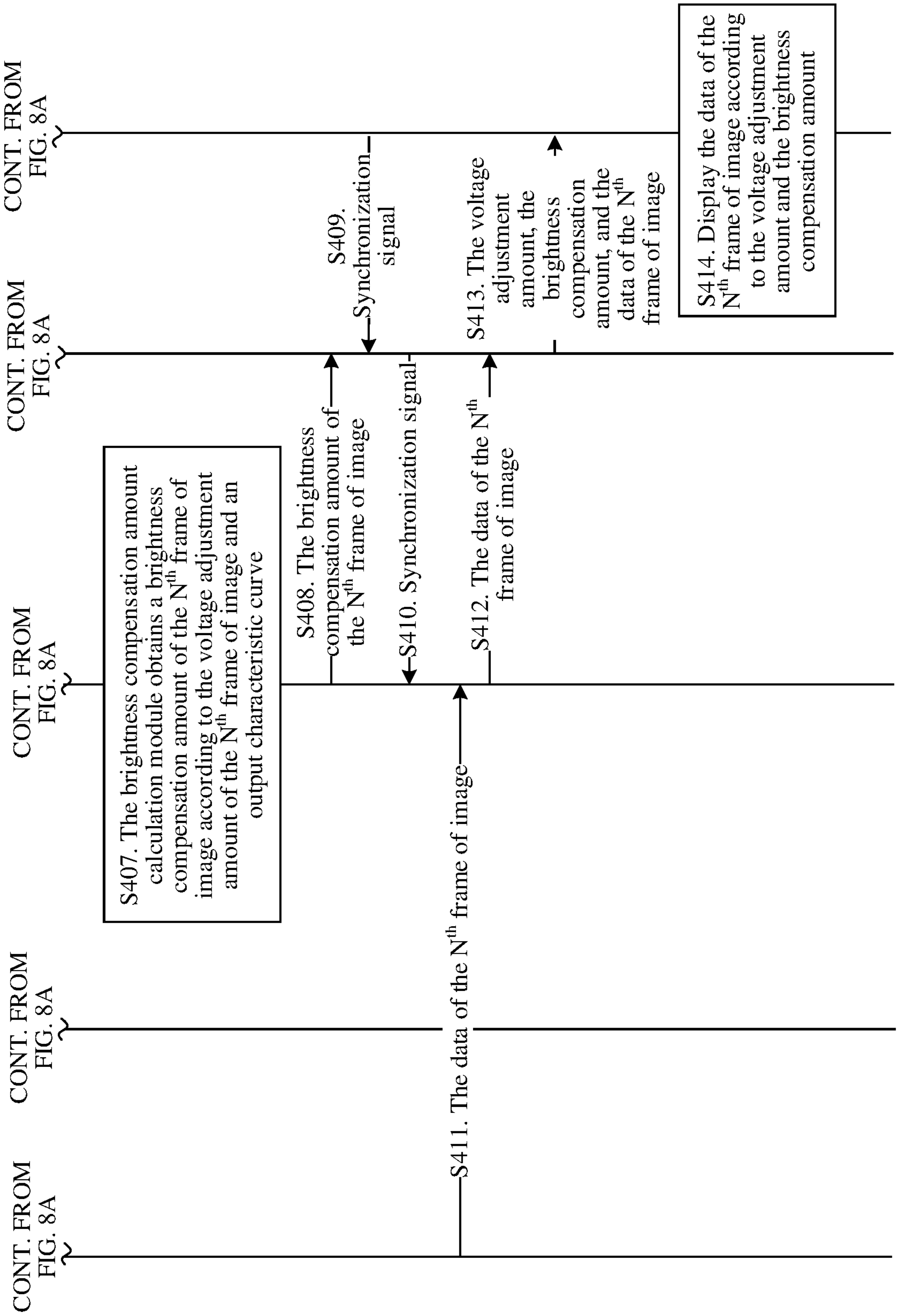

FIG. 8A and FIG. 8B show detailed description for a method for adjusting a drive voltage of a display assembly according to an embodiment of this application. As shown in FIG. 8A and FIG. 8B, the method includes step S401 to step S414. Step S401 to step S414 are respectively described below in detail.

Step S401. A display caching module sends data of an $N^{th}$ frame of image to a central processing unit.

Exemplarily, the central processing unit may obtain the data of the $N^{th}$ frame of image from the display caching module, where N is a positive integer.

Exemplarily, a graphics processing unit, a video decoder (video decoder), a component (video processing unit, VPU) connected to the display assembly, or the like may write image data into the display caching module.

It should be understood that, the data of the $N^{th}$ frame of image may be data of a current frame of image written into the display caching module, that is, the data of the $N^{th}$ frame of image is data of a to-be-displayed frame of image.

Exemplarily, when the display caching module writes the data of the $N^{th}$ frame of image, the central processing unit may obtain the data of the image from the display caching module according to a computing capability.

Step S402. The central processing unit sends the data of the $N^{th}$ frame of image to a graphics processing unit.

Step S403. An image highest gray scale calculation module in the graphics processing unit determines a highest gray scale of the $N^{th}$ frame of image according to the data of the $N^{th}$ frame of image.

Exemplarily, the display caching module stores data of a plurality of frames of images. The image highest gray scale calculation module may obtain data of an image from the display caching module according to a computing capability; and determine a highest gray scale of the image according to the data of the image. Exemplarily, the highest gray scale of the $N^{th}$ frame of image may be obtained by identifying a histogram of the $N^{th}$ frame of image.

For example, for a display assembly of 8-bit color depth, an ideal gray scale range is 0 to 255; and for the $N^{th}$ frame of image, the highest gray scale of the $N^{th}$ frame of image may be determined as 230 according to the histogram of the $N^{th}$ frame of image.

For example, for a display assembly of 10-bit color depth, an ideal gray scale range is 0 to 1023; and for the $N^{th}$ frame of image, the highest gray scale of the $N^{th}$ frame of image may be determined as 900 according to the histogram of the $N^{th}$ frame of image.

Exemplarily, the highest gray scale of the $N^{th}$ frame of image may be determined by traversing each pixel point in the $N^{th}$ frame of image.

Exemplarily, the highest gray scale of the $N^{th}$ frame of image may be outputted by a previous component connected to the display caching module; and the previous component connected to the display assembly may be a GPU, a video decoder (video decoder), a component (video processing unit, VPU) connected to the display assembly, or the like.

Step S404. The graphics processing unit sends the highest gray scale of the $N^{th}$ frame of image to the central processing unit.

Exemplarily, the central processing unit includes a voltage adjustment amount calculation module and a brightness compensation amount calculation module.

Step S405. The voltage adjustment amount calculation module in the central processing unit determines a minimum voltage difference according to the highest gray scale of the $N^{th}$ frame of image; and determines a voltage adjustment amount of the $N^{th}$ frame of image according to the minimum voltage difference.

Exemplarily, the voltage adjustment amount calculation module may determine a minimum current required by a light-emitting body (such as, a light-emitting diode) in a pixel driving circuit according to the highest gray scale of the $N^{th}$ frame of image; because a working voltage of the light-emitting body is proportional to a working current, a minimum voltage difference between a drain and a source may be determined according to the minimum current required by the light-emitting body and an output characteristic curve of a $T_2$ thin film transistor; and a minimum voltage difference between a working voltage ($V_{DD}$) of the pixel driving circuit and a drive voltage ($V_{SS}$) may be determined according to the minimum voltage difference between the drain and the source, so as to determine the voltage adjustment amount of the $N^{th}$ frame of image.

Optionally, in a possible implementation, the voltage adjustment amount of the $N^{th}$ frame of image may be an absolute value of a drive voltage when the display assembly displays the $N^{th}$ frame of image.

Optionally, in a possible implementation, the voltage adjustment amount of the $N^{th}$ frame of image may be a voltage difference relative to a drive voltage (an example of a first drive voltage) of an $(N-1)^{th}$ frame of image.

It should be understood that, because one frame of image corresponds to one drive voltage, that is, a plurality of pixel driving circuits included in one frame of image share one drive voltage, it is necessarily ensured that the drive voltage enables that a highest gray scale in one frame of image can be normally displayed. In this embodiment of this application, a value of a drive voltage required when a display assembly displays an $N^{th}$ frame of image, namely, a minimum voltage required when displaying the $N^{th}$ frame of image, may be determined through a highest gray scale of the $N^{th}$ frame of image. Under a condition of the same brightness, the highest gray scale of the $N^{th}$ frame of image determines a minimum voltage difference between a working voltage of a pixel driving circuit and the drive voltage. The working voltage usually does not change, and the drive voltage is adjusted so that the minimum voltage difference required when the display assembly displays the $N^{th}$ frame of image is met.

Step S406. The central processing unit sends the voltage adjustment amount of the $N^{th}$ frame of image to a display interface.

Step S407. The brightness compensation amount calculation module in the central processing unit obtains a brightness compensation amount of the $N^{th}$ frame of image according to the voltage adjustment amount of the $N^{th}$ frame of image and an output characteristic curve.

For example, the brightness compensation amount calculation module determines the brightness compensation amount of the $N^{th}$ frame of image according to the voltage adjustment amount of the $N^{th}$ frame of image and an output characteristic curve of a transistor, where the transistor is a transistor configured to provide the drive current for the light-emitting body in the pixel driving circuit, for example, the $T_2$ thin film transistor shown in FIG. 2.

It should be understood that, in this embodiment of this application, the thin film transistor configured to provide the drive current for the light-emitting body (such as, the OLED) in the pixel driving circuit may always work in the saturation region, that is, when the display assembly displays the highest gray scale and a lowest gray scale of the $N^{th}$ frame of image, the thin film transistor configured to provide the drive current for the light-emitting body may always work in the saturation region of the output characteristic curve; and the thin film transistor outputs different drain currents, so that the light-emitting body displays different brightness.

It should be noted that, an essence of the brightness compensation amount may be regarded as a current compensation amount. Because the brightness and the current are strongly correlated, as shown in FIG. 6, because the output characteristic curve of the $T_2$ thin film transistor cannot fully reach the ideal state in the saturation region, the current needs to be compensated so that a horizontal axis of the output characteristic curve is parallel to an X axis. Through the brightness compensation amount, the brightness of the displayed image can reach a brightness effect corresponding to an output current of the saturation region in the ideal state.

Exemplarily, the output characteristic curve shown in FIG. 6 may determine a slope of the curve in the saturation region, and may determine $\Delta U$ according to the voltage adjustment amount; and may obtain $\Delta I$ according to the slope of the output characteristic curve in the saturation region and $\Delta U$, and may obtain the brightness compensation amount according to $\Delta I$.

Step S408. The central processing unit sends the brightness compensation amount of the $N^{th}$ frame of image to the display interface.

Step S409. The display assembly sends a synchronization signal to the display interface.

Exemplarily, the synchronization signal may be used for indicating that the display assembly starts to display the $N^{th}$ frame of image.

Step S410. The display interface sends the synchronization signal to the central processing unit.

Step S411. The display caching module sends the data of the $N^{th}$ frame of image to the central processing unit.

Exemplarily, the central processing unit may obtain the data of the $N^{th}$ frame of image from the display caching module after receiving the synchronization signal.

Step S412. The central processing unit sends the data of the $N^{th}$ frame of image to the display interface.

Step S413. The display interface sends the voltage adjustment amount, the brightness compensation amount, and the data of the $N^{th}$ frame of image to the display assembly.

Exemplarily, the display interface sends the voltage adjustment amount of the $N^{th}$ frame of image, the brightness compensation amount of the $N^{th}$ frame of image, and the data of the $N^{th}$ frame of image to the display assembly.

Optionally, the voltage adjustment amount of the $N^{th}$ frame of image may be the absolute value of the drive voltage when the display assembly displays the $N^{th}$ frame of image.

Optionally, the voltage adjustment amount of the $N^{th}$ frame of image may be the voltage difference relative to the drive voltage of the $(N-1)^{th}$ frame of image.

For example, the voltage difference may be a voltage difference between the drive voltage when displaying the $(N-1)^{th}$ frame of image and the drive voltage of the $N^{th}$ frame of image.

Situation 1: The Display Assembly is a Display Assembly without a Cache Region.

In an example, when the display assembly has no cache region, the display assembly cannot cache the data of the $N^{th}$ frame of image. Therefore, after receiving the synchronization signal, the display interface may first send the voltage adjustment amount of the $N^{th}$ frame of image and the brightness compensation amount of the $N^{th}$ frame of image to the display assembly, and then send the data of the $N^{th}$ frame of image to the display assembly.

Situation 2: The Display Assembly is a Display Assembly with One Cache Region.

In an example, when the display assembly has one cache region, the display assembly may be configured to cache data of next frame of image of a current frame of image, and then, after receiving a synchronization instruction, the display interface may simultaneously send the voltage adjustment amount of the $N^{th}$ frame of image, the brightness compensation amount of the $N^{th}$ frame of image, and the data of the $N^{th}$ frame of image; or, may first send the data of the $N^{th}$ frame of image, and then send the voltage adjustment amount of the $N^{th}$ frame of image and the brightness compensation amount of the $N^{th}$ frame of image.

Situation 3: The Display Assembly is a Display Assembly with a Plurality of Cache Regions.

In an example, when the display assembly has the plurality of cache regions, the display interface needs to mark when sending a voltage adjustment amount, a brightness compensation amount, and data of an image to the display assembly, that is, one frame of image and a group of a voltage adjustment amount and a brightness compensation amount corresponding to the one frame of image are marked.

It should be understood that, the voltage adjustment amount and the brightness compensation amount are related to a highest gray scale in the image; and for different images, if highest gray scales in the images are different, voltage adjustment amounts and brightness compensation amounts may be different.

Step S414. The display assembly displays the data of the $N^{th}$ frame of image according to the voltage adjustment amount and the brightness compensation amount.

For example, the display assembly may perform settings according to the voltage adjustment amount of the $N^{th}$ frame of image and the brightness compensation amount of the $N^{th}$ frame of image, and then display the data of the $N^{th}$ frame of image.

It should be understood that, the drive voltage of the display assembly may be $V_{SS}$ in the pixel driving circuit shown in FIG. 2. Because the $T_2$ thin film transistor works in the saturation region, the drive current provided by the $T_2$ thin film transistor for the light-emitting body does not change with the voltage difference, that is, adjusting the drive voltage has less effect on the drive current of the light-emitting body (such as, the OLED). In addition, because an adjustment speed can reach more than 60 frames, the image displayed by the display assembly does not have a problem of flickering.

In this embodiment of this application, a voltage required when a display assembly displays an $N^{th}$ frame of image may be determined according to a highest gray scale of the $N^{th}$ frame of image; and a drive voltage of the display assembly is adjusted according to the voltage required when displaying the $N^{th}$ frame of image, so that the drive voltage can be reduced when a normal display of the image is ensured, so as to reduce the power consumption of the display assembly. In addition, a brightness compensation amount may be determined according to the voltage required by the $N^{th}$ frame of image and an output characteristic curve of a drive transistor (such as, a transistor configured to provide a drive current for a light-emitting body) in a pixel driving circuit, so as to perform brightness compensation on the $N^{th}$ frame of Implementation 2

In an example, if a $T_2$ thin film transistor is in an ideal state, that is, currents outputted when the $T_2$ thin film transistor is in a saturation region are completely the same, or when a user cannot identify in a case that a drive current corresponding to a voltage adjustment amount meets a specific threshold, there is no need to perform brightness compensation when displaying data of an $N^{th}$ frame of image; and a drive voltage required when a display assembly displays the $N^{th}$ frame of image is determined according to a highest gray scale of the $N^{th}$ frame of image, so as to adjust a drive voltage of a pixel driving circuit.

Figure 9:
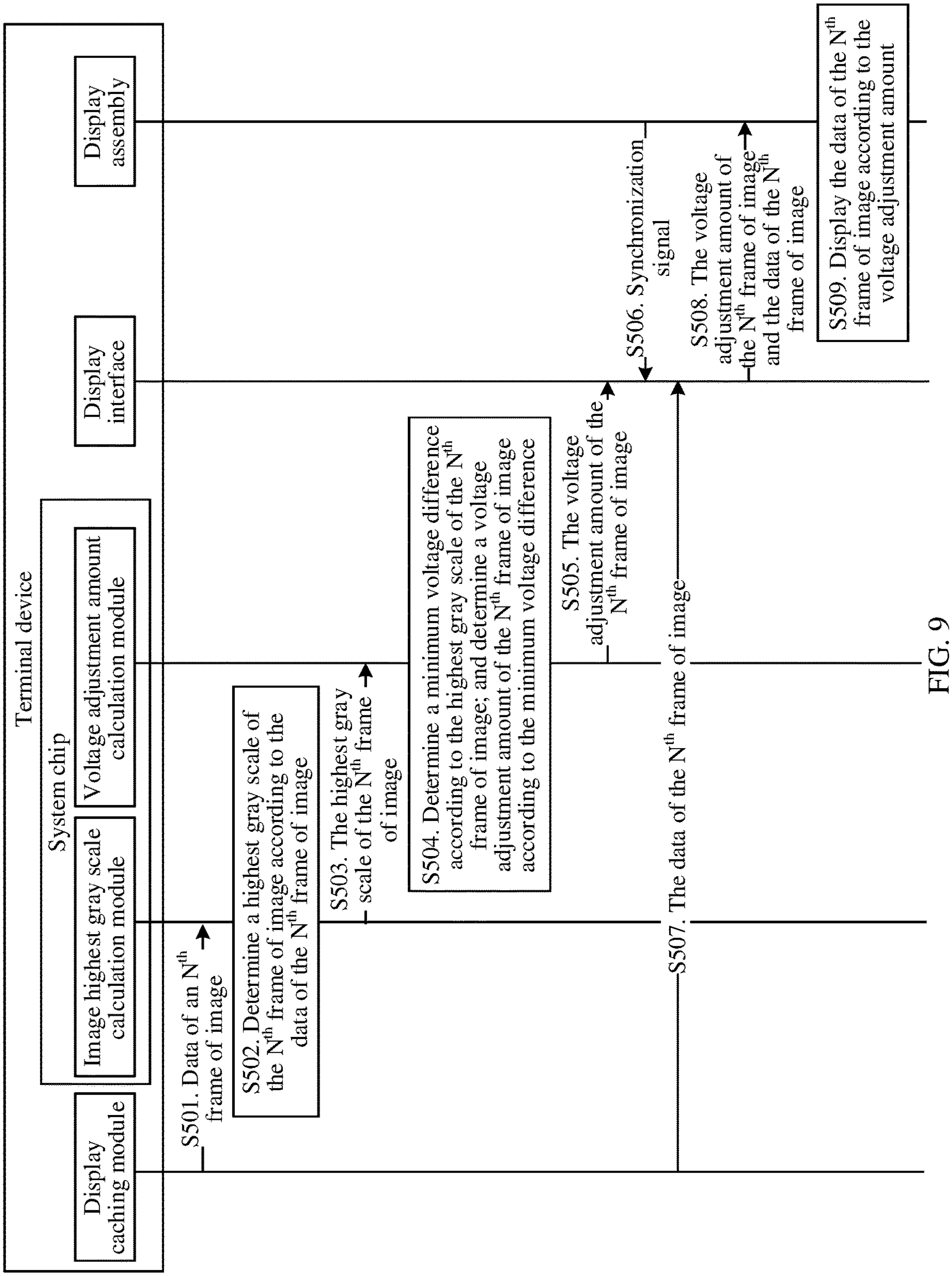
FIG. 9 shows a method for adjusting a drive voltage of a display assembly according to an embodiment of this application.

FIG. 9 shows detailed description for a method for adjusting a drive voltage of a display assembly according to an embodiment of this application. As shown in FIG. 9, the method includes step S501 to step S509. Step S501 to step S509 are respectively described below in detail.

Step S501. A display caching module sends data of an $N^{th}$ frame of image to an image highest gray scale calculation module.

N is a positive integer.

Exemplarily, a graphics processing unit, a video decoder (video decoder), a component (video processing unit, VPU) connected to the display assembly, or the like may write image data into the display caching module.

It should be understood that, the data of the $N^{th}$ frame of image may be data of a current frame of image written into the display caching module, that is, the data of the $N^{th}$ frame of image is data of a to-be-displayed frame of image.

Exemplarily, when the display caching module may include data of a plurality of frames of images, a central processing unit may obtain the data from the display caching module according to a computing capability. Optionally, when the display caching module writes new image data, the display caching module may actively send the image data to the image highest gray scale calculation module.

Optionally, when the display caching module receives an instruction, the display caching module may send the data of the $N^{th}$ frame of image to the image highest gray scale calculation module. For example, after the display caching module receives an image data invoking instruction sent by the image highest gray scale calculation module, the display caching module may send the newly written image data to the image highest gray scale calculation module.

Step S502. The image highest gray scale calculation module determines a highest gray scale of the $N^{th}$ frame of image according to the data of the $N^{th}$ frame of image.

Exemplarily, the highest gray scale of the $N^{th}$ frame of image may be obtained by identifying a histogram of the $N^{th}$ frame of image.

For example, for a display assembly of 8-bit color depth, an ideal gray scale range is 0 to 255; and for the $N^{th}$ frame of image, the highest gray scale of the $N^{th}$ frame of image may be determined as 230 according to the histogram of the $N^{th}$ frame of image.

For example, for a display assembly of 10-bit color depth, an ideal gray scale range is 0 to 1023; and for the $N^{th}$ frame of image, the highest gray scale of the $N^{th}$ frame of image may be determined as 900 according to the histogram of the $N^{th}$ frame of image.

Exemplarily, the highest gray scale of the $N^{th}$ frame of image may be determined by traversing each pixel point in the $N^{th}$ frame of image.

Exemplarily, a maximum brightness value of the $N^{th}$ frame of image may be outputted by a previous component connected to the display caching module, and the highest gray scale of the $N^{th}$ frame of image may be determined according to the maximum brightness value of the $N^{th}$ frame of image. the previous component connected to the display assembly may be a GPU, a video decoder (video decoder), a component (video processing unit, VPU) connected to the display assembly, or the like.

Step S503. The image highest gray scale calculation module sends the highest gray scale of the $N^{th}$ frame of image to a voltage adjustment amount calculation module.

Step S504. The voltage adjustment amount calculation module determines a minimum voltage difference according to the highest gray scale of the $N^{th}$ frame of image; and determines a voltage adjustment amount of the $N^{th}$ frame of image according to the minimum voltage difference.

Exemplarily, the voltage adjustment amount calculation module may determine a minimum current required by a light-emitting body (such as, a light-emitting diode) in a pixel driving circuit according to the highest gray scale of the $N^{th}$ frame of image; because a working voltage of the light-emitting body is proportional to a working current, a minimum voltage difference between a drain and a source may be determined according to the minimum current required by the light-emitting body and an output characteristic curve of a $T_2$ thin film transistor; and a minimum voltage difference between a working voltage ($V_{DD}$) of the pixel driving circuit and a drive voltage ($V_{SS}$) may be determined according to the minimum voltage difference between the drain and the source, so as to determine the voltage adjustment amount of the $N^{th}$ frame of image.

For example, as shown in FIG. 6, EM is used for controlling working states of a $T_3$ thin film transistor and a $T_4$ thin film transistor, and when the $T_3$ thin film transistor and the $T_4$ thin film transistor are turned on, a voltage difference between the $T_3$ thin film transistor and the $T_4$ thin film transistor is approximately 0, and then $V_{DD}-V_{SS}-U_{DS}=V_{OLED}$; the minimum current required by the light-emitting body (such as, an OLED) may be determined according to the highest gray scale of the $N^{th}$ frame of image, and a working voltage $V_{OLED}$ of the light-emitting body may be determined because the voltage of the light-emitting body is proportional to the current; according to the output characteristic curve of the $T_2$ thin film transistor, when it is ensured that the drive current meets the highest gray scale of the $N^{th}$ frame of image, $U_{DS}$ of the $T_2$ thin film transistor may be selected as a critical point between a linear region and a saturation region; because $V_{DD}-V_{SS}-U_{DS}=V_{OLED}$, $V_{DD}-V_{SS}$ may be obtained in a case that Ups and $V_{OLED}$ are determined; and $V_{DD}$ usually does not change, so that $V_{SS}$, namely, the voltage adjustment amount of the $N^{th}$ frame of image, can be determined.

It should be understood that, a drive current in the saturation region of the output characteristic curve of the $T_2$ thin film transistor does not change, and because $V_{DD}-V_{SS}-U_{DS}=V_{OLED}$, and $V_{OLED}$ is determined according to the drive current, smaller $U_{DS}$ indicates smaller $V_{DD}-V_{SS}$; and because $V_{DD}$ usually remains unchanged and $V_{SS}$ is a negative voltage value, smaller $V_{DD}-V_{SS}$ indicates a smaller absolute value of the drive voltage $V_{SS}$, so that the drive voltage of the display assembly can be reduced, so as to effectively reduce the power consumption of the display assembly.

Optionally, in a possible implementation, the voltage adjustment amount of the $N^{th}$ frame of image may be an absolute value of a drive voltage when the display assembly displays the $N^{th}$ frame of image.

Optionally, in a possible implementation, the voltage adjustment amount of the $N^{th}$ frame of image may be a voltage difference relative to a drive voltage of an (N−1)' h frame of image.

It should be understood that, because one frame of image corresponds to one drive voltage, that is, a plurality of pixel driving circuits included in one frame of image share one drive voltage, it is necessarily ensured that the drive voltage enables that a highest gray scale in one frame of image can be normally displayed. In this embodiment of this application, a value of a drive voltage required when a display assembly displays an $N^{th}$ frame of image, namely, a minimum voltage required when displaying the $N^{th}$ frame of image, may be determined through a highest gray scale of the $N^{th}$ frame of image. Under a condition of the same brightness, the highest gray scale of the $N^{th}$ frame of image determines a minimum voltage difference between a working voltage of a pixel driving circuit and the drive voltage. The working voltage usually does not change, and the drive voltage is adjusted so that the minimum voltage difference required when the display assembly displays the $N^{th}$ frame of image is met.

Step S505. The voltage adjustment amount calculation module sends the voltage adjustment amount of the $N^{th}$ frame of image to a display interface.

Step S506. The display assembly sends a synchronization signal to the display interface.

Exemplarily, the synchronization signal may be used for indicating that the display assembly starts to display the $N^{th}$ frame of image.

Step S507. The display caching module sends the data of the $N^{th}$ frame of image to the display interface.

Exemplarily, the display interface may obtain the data of the $N^{th}$ frame of image from the display caching module after receiving the synchronization signal.

Step S508. The display interface sends the voltage adjustment amount of the $N^{th}$ frame of image and the data of the $N^{th}$ frame of image to the display assembly.

Optionally, the voltage adjustment amount of the $N^{th}$ frame of image may be the absolute value of the drive voltage when the display assembly displays the $N^{th}$ frame of image.

Optionally, the voltage adjustment amount of the $N^{th}$ frame of image may be the voltage difference relative to the drive voltage of the $(N-1)^{th}$ frame of image.

For example, the voltage difference may be a voltage difference between the drive voltage when displaying the $(N-1)^{th}$ frame of image and the drive voltage of the $N^{th}$ frame of image.

Situation 1: The Display Assembly is a Display Assembly without a Cache Region.

In an example, when the display assembly has no cache region, the display assembly cannot cache the data of the $N^{th}$ frame of image. Therefore, after receiving the synchronization signal, the display interface may first send the voltage adjustment amount of the $N^{th}$ frame of image to the display assembly, and then send the data of the $N^{th}$ frame of image to the display assembly.

Situation 2: The Display Assembly is a Display Assembly with One Cache Region.

In an example, when the display assembly has one cache region, the display assembly may be configured to cache data of next frame of image of a current frame of image, and then, after receiving a synchronization instruction, the display interface may simultaneously send the voltage adjustment amount of the $N^{th}$ frame of image and the data of the $N^{th}$ frame of image; or, may first send the data of the $N^{th}$ frame of image, and then send the voltage adjustment amount of the $N^{th}$ frame of image.

Situation 3: The Display Assembly is a Display Assembly with a Plurality of Cache Regions.

In an example, when the display assembly has the plurality of cache regions, the display interface needs to mark when sending a voltage adjustment amount to the display assembly, that is, one frame of image and a voltage adjustment amount corresponding to the one frame of image are marked.

It should be understood that, the voltage adjustment amount is related to a highest gray scale in the image; and for different images, if highest gray scales in the images are different, voltage adjustment amounts may be different.

Step S509. Display the data of the $N^{th}$ frame of image according to the voltage adjustment amount.

For example, the display assembly may perform settings according to the voltage adjustment amount of the $N^{th}$ frame of image, and then display the data of the $N^{th}$ frame of image.

It should be understood that, the drive voltage of the display assembly may be $V_{SS}$ in the pixel driving circuit shown in FIG. 2. Because the $T_2$ thin film transistor works in the saturation region, the drive current provided by the $T_2$ thin film transistor for the light-emitting body does not change with the voltage difference, that is, adjusting the drive voltage has less effect on the drive current of the light-emitting body (such as, the OLED). In addition, because an adjustment speed can reach more than 60 frames, the image displayed by the display assembly does not have a problem of flickering.

In this embodiment of this application, a voltage required when a display assembly displays an $N^{th}$ frame of image may be determined according to a highest gray scale of the $N^{th}$ frame of image; and a drive voltage of the display assembly is adjusted according to the voltage required when displaying the $N^{th}$ frame of image, so that the drive voltage can be reduced when a normal display of the image is ensured, so as to reduce the power consumption of the display assembly.

Optionally, in an example, if a system chip shown in FIG. 9 may include a central processing unit, an image highest gray scale calculation module and a voltage adjustment amount calculation module may be modules in the central processing unit; and the central processing unit may execute step S502 to step S507.

Optionally, in an example, if a system chip shown in FIG. 9 may include a central processing unit and a graphics processing unit, an image highest gray scale calculation module and a voltage adjustment amount calculation module may be modules in the graphics processing unit; the central processing unit obtains data of an $N^{th}$ frame of image from a display caching module and sends the data of the $N^{th}$ frame of image to the graphics processing unit, and the graphics processing unit may execute step S502 and step S504; the graphics processing unit sends a voltage adjustment amount of the $N^{th}$ frame of image to the central processing unit; and the central processing unit sends the voltage adjustment amount of the $N^{th}$ frame of image to a display interface.

Figure 10:
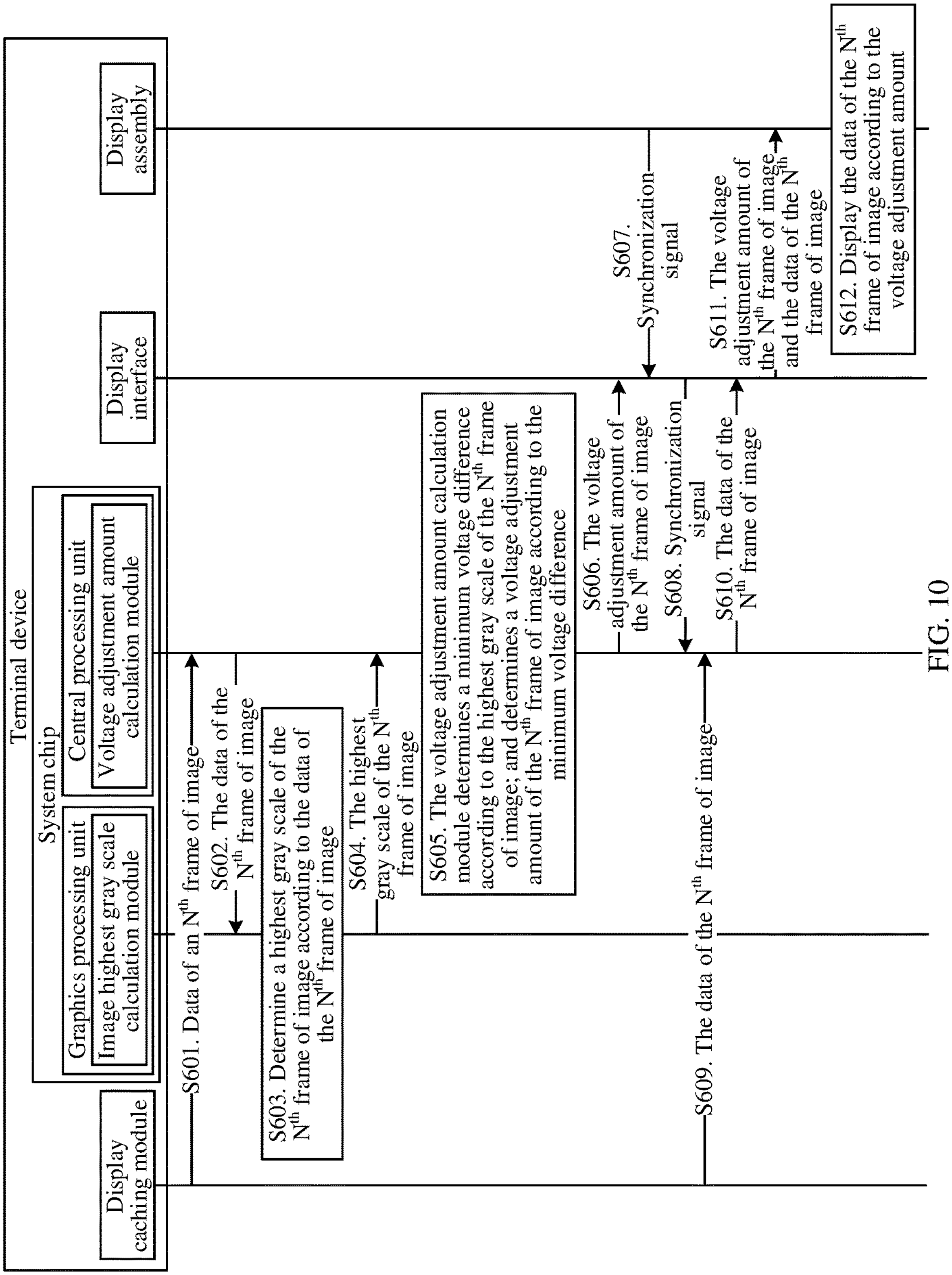
FIG. 10 shows a method for adjusting a drive voltage of a display assembly according to an embodiment of this application.

Optionally, in an example, if a system chip shown in FIG. 9 may include a central processing unit and a graphics processing unit, the graphics processing unit may include an image highest gray scale calculation module, the central processing unit may include a voltage adjustment amount calculation module, and the central processing unit may interact with the graphics processing unit to complete step S502 to step S507, as shown in FIG. 10.

It should be noted that, the above graphics processing unit may also be another processor configured to compute, such as a digital signal processor. This is not limited in this application.

FIG. 10 shows detailed description for a method for adjusting a drive voltage of a display assembly according to an embodiment of this application. As shown in FIG. 10, the method includes step S601 to step S612. Step S601 to step S612 are respectively described below in detail.

Step S601. A display caching module sends data of an $N^{th}$ frame of image to a central processing unit.

Exemplarily, the central processing unit obtains the data of the $N^{th}$ frame of image from the display caching module, where N is a positive integer.

Exemplarily, a graphics processing unit, a video decoder (video decoder), a component (video processing unit, VPU) connected to the display assembly, or the like may write image data into the display caching module.

It should be understood that, the data of the $N^{th}$ frame of image may be data of a current frame of image written into the display caching module, that is, the data of the $N^{th}$ frame of image is data of a to-be-displayed frame of image.

Exemplarily, when the display caching module writes the data of the $N^{th}$ frame of image, the central processing unit may obtain the data of the image from the display caching module according to a computing capability.

Step S602. The central processing unit sends the data of the $N^{th}$ frame of image to a graphics processing unit.

Step S603. An image highest gray scale calculation module in the graphics processing unit determines a highest gray scale of the $N^{th}$ frame of image according to the data of the $N^{th}$ frame of image.

Exemplarily, the display caching module stores data of a plurality of frames of images. The image highest gray scale calculation module may obtain data of an image from the display caching module according to a computing capability; and determine a highest gray scale of the image according to the data of the image. Exemplarily, the highest gray scale of the $N^{th}$ frame of image may be obtained by identifying a histogram of the $N^{th}$ frame of image.

For example, for a display assembly of 8-bit color depth, an ideal gray scale range is 0 to 255; and for the $N^{th}$ frame of image, the highest gray scale of the $N^{th}$ frame of image may be determined as 230 according to the histogram of the $N^{th}$ frame of image.

For example, for a display assembly of 10-bit color depth, an ideal gray scale range is 0 to 1023; and for the $N^{th}$ frame of image, the highest gray scale of the $N^{th}$ frame of image may be determined as 900 according to the histogram of the $N^{th}$ frame of image.

Exemplarily, the highest gray scale of the $N^{th}$ frame of image may be determined by traversing each pixel point in the $N^{th}$ frame of image.

Exemplarily, the highest gray scale of the $N^{th}$ frame of image may be outputted by a previous component connected to the display caching module; and the previous component connected to the display assembly may be a GPU, a video decoder (video decoder), a component (video processing unit, VPU) connected to the display assembly, or the like.

Step S604. The graphics processing unit sends the highest gray scale of the $N^{th}$ frame of image to the central processing unit.

Exemplarily, the central processing unit includes a voltage adjustment amount calculation module and a brightness compensation calculation module.

Step S605. The voltage adjustment amount calculation module in the central processing unit determines a minimum voltage difference according to the highest gray scale of the $N^{th}$ frame of image; and determines a voltage adjustment amount of the $N^{th}$ frame of image according to the minimum voltage difference.

Exemplarily, the voltage adjustment amount calculation module may determine a minimum current required by a light-emitting body (such as, a light-emitting diode) in a pixel driving circuit according to the highest gray scale of the $N^{th}$ frame of image; because a working voltage of the light-emitting body is proportional to a working current, a minimum voltage difference between a drain and a source may be determined according to the minimum current required by the light-emitting body and an output characteristic curve of a $T_2$ thin film transistor; and a minimum voltage difference between a working voltage ($V_{DD}$) of the pixel driving circuit and a drive voltage ($V_{SS}$) may be determined according to the minimum voltage difference between the drain and the source, so as to determine the voltage adjustment amount of the $N^{th}$ frame of image.

Optionally, in a possible implementation, the voltage adjustment amount of the $N^{th}$ frame of image may be an absolute value of a drive voltage when the display assembly displays the $N^{th}$ frame of image.

Optionally, in a possible implementation, the voltage adjustment amount of the $N^{th}$ frame of image may be a voltage difference relative to a drive voltage (an example of a first drive voltage) of an $(N-1)^{th}$ frame of image.

It should be understood that, because one frame of image corresponds to one drive voltage, that is, a plurality of pixel driving circuits included in one frame of image share one drive voltage, it is necessarily ensured that the drive voltage enables that a highest gray scale in one frame of image can be normally displayed. In this embodiment of this application, a value of a drive voltage required when a display assembly displays an $N^{th}$ frame of image, namely, a minimum voltage required when displaying the $N^{th}$ frame of image, may be determined through a highest gray scale of the $N^{th}$ frame of image. Under a condition of the same brightness, the highest gray scale of the $N^{th}$ frame of image determines a minimum voltage difference between a working voltage of a pixel driving circuit and the drive voltage. The working voltage usually does not change, and the drive voltage is adjusted so that the minimum voltage difference required when the display assembly displays the $N^{th}$ frame of image is met.

Step S606. The central processing unit sends the voltage adjustment amount of the $N^{th}$ frame of image to a display interface.

Step S607. The display assembly sends a synchronization signal to the display interface.

Exemplarily, the synchronization signal may be used for indicating that the display assembly starts to display the $N^{th}$ frame of image.

Step S608. The display interface sends the synchronization signal to the central processing unit.

Step S609. The display caching module sends the data of the $N^{th}$ frame of image to the central processing unit.

Exemplarily, the central processing unit may obtain the data of the $N^{th}$ frame of image from the display caching module after receiving the synchronization signal.

Step S610. The central processing unit sends the data of the $N^{th}$ frame of image to the display interface.

Step S611. The display interface sends the voltage adjustment amount of the $N^{th}$ frame of image and the data of the $N^{th}$ frame of image to the display assembly.

Optionally, the voltage adjustment amount of the $N^{th}$ frame of image may be the absolute value of the drive voltage when the display assembly displays the $N^{th}$ frame of image.

Optionally, the voltage adjustment amount of the $N^{th}$ frame of image may be the voltage difference relative to the drive voltage of the $(N-1)^{th}$ frame of image.

For example, the voltage difference may be a voltage difference between the drive voltage when displaying the $(N-1)^{th}$ frame of image and the drive voltage of the $N^{th}$ frame of image.

Situation 1: The Display Assembly is a Display Assembly without a Cache Region.

In an example, when the display assembly has no cache region, the display assembly cannot cache the data of the $N^{th}$ frame of image. Therefore, after receiving the synchronization signal, the display interface may first send the voltage adjustment amount of the $N^{th}$ frame of image to the display assembly, and then send the data of the $N^{th}$ frame of image to the display assembly.

Situation 2: The Display Assembly is a Display Assembly with One Cache Region.

In an example, when the display assembly has one cache region, the display assembly may be configured to cache data of next frame of image of a current frame of image, and then, after receiving a synchronization instruction, the display interface may simultaneously send the voltage adjustment amount of the $N^{th}$ frame of image and the data of the $N^{th}$ frame of image; or, may first send the data of the $N^{th}$ frame of image, and then send the voltage adjustment amount of the $N^{th}$ frame of image.

Situation 3: The Display Assembly is a Display Assembly with a Plurality of Cache Regions.

In an example, when the display assembly has the plurality of cache regions, the display interface needs to mark when sending a voltage adjustment amount to the display assembly, that is, one frame of image and a voltage adjustment amount corresponding to the one frame of image are marked.

It should be understood that, the voltage adjustment amount is related to a highest gray scale in the image; and for different images, if highest gray scales in the images are different, voltage adjustment amounts may be different.

Step S612. The display assembly displays the data of the $N^{th}$ frame of image according to the voltage adjustment amount.

For example, the display assembly may perform settings according to the voltage adjustment amount of the $N^{th}$ frame of image, and then display the data of the $N^{th}$ frame of image.

It should be understood that, the drive voltage of the display assembly may be $V_{SS}$ in the pixel driving circuit shown in FIG. 2. Because the $T_2$ thin film transistor works in the saturation region, the drive current provided by the $T_2$ thin film transistor for the light-emitting body does not change with the voltage difference, that is, adjusting the drive voltage has less effect on the drive current of the light-emitting body (such as, the OLED). In addition, because an adjustment speed can reach more than 60 frames, the image displayed by the display assembly does not have a problem of flickering.

In this embodiment of this application, a voltage required when a display assembly displays an $N^{th}$ frame of image may be determined according to a highest gray scale of the $N^{th}$ frame of image; and a drive voltage of the display assembly is adjusted according to the voltage required when displaying the $N^{th}$ frame of image, so that the drive voltage can be reduced when a normal display of the image is ensured, so as to reduce the power consumption of the display assembly.

It should be understood that, the following example is merely intended to help a person skilled in the art to understand the embodiments of this application, and is not intended to limit the embodiments of this application to specific values or specific scenarios in the example. Obviously, a person skilled in the art may make various equivalent modifications or variations according to the given example. The modifications or variations also fall with the scope of the embodiments of this application.

The methods for adjusting a drive voltage of a display assembly provided in the embodiments of this application are described above in detail with reference to FIG. 1 to FIG. 10. An apparatus embodiment of this application is described below in detail with reference to FIG. 11 and FIG. 12. It should be understood that, the apparatus in this embodiment of this application may perform the methods in the foregoing embodiments of this application, that is, for specific working processes of the following products, reference may be made to corresponding processes in the foregoing method embodiments.

Figure 11:
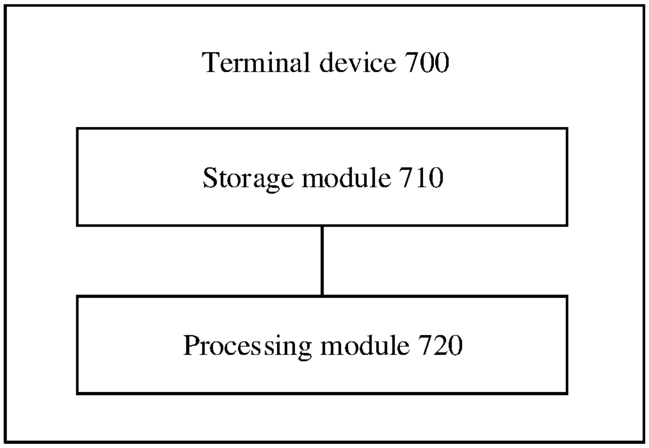
FIG. 11 is a schematic structural diagram of a terminal device according to an embodiment of this application.

FIG. 11 is a schematic structural diagram of a terminal device according to an embodiment of this application. A terminal device 500 includes an active light-emitting display assembly, a storage module 710, and a processing module 720, where the storage module 710 is configured to store image data of an $N^{th}$ frame of image, where N is a positive integer; and the processing module 720 is configured to obtain the image data of the $N^{th}$ frame of image from the storage module 710; obtain a highest gray scale of the $N^{th}$ frame of image according to the image data, where the highest gray scale of the $N^{th}$ frame of image is a maximum value of gray scales corresponding to pixels in the $N^{th}$ frame of image; obtain a drive voltage of the $N^{th}$ frame of image according to the highest gray scale of the $N^{th}$ frame of image, where the drive voltage of the $N^{th}$ frame of image is a voltage required in a case that the display assembly displays the $N^{th}$ frame of image; and send a voltage adjustment amount of the $N^{th}$ frame of image to the display assembly, where the voltage adjustment amount of the $N^{th}$ frame of image is obtained according to the drive voltage of the $N^{th}$ frame of image.

Optionally, in an embodiment, the voltage adjustment amount of the $N^{th}$ frame of image is a voltage value of the drive voltage of the $N^{th}$ frame of image.

Optionally, in an embodiment, the voltage adjustment amount of the $N^{th}$ frame of image is a voltage difference between the drive voltage of the $N^{th}$ frame of image and a first drive voltage, and the first drive voltage is a drive voltage of an $(N-1)^{th}$ frame of image.

Optionally, in an embodiment, the processing module 720 is specifically configured to:

obtain a histogram of the $N^{th}$ frame of image according to the image data; and obtain the highest gray scale of the $N^{th}$ frame of image according to the histogram of the $N^{th}$ frame of image.

Optionally, in an embodiment, the display assembly includes a pixel driving circuit, the pixel driving circuit includes a first thin film transistor and a light-emitting body, the first thin film transistor is configured to provide a drive current for the light-emitting body, and the processing module 720 is specifically configured to:

determine a drive current of the $N^{th}$ frame of image according to the highest gray scale of the $N^{th}$ frame of image, where the drive current of the $N^{th}$ frame of image is a current required in a case that the display assembly displays the $N^{th}$ frame of image through the pixel driving circuit; and determine the drive voltage of the $N^{th}$ frame of image according to the drive current of the $N^{th}$ frame of image and an output characteristic curve of the first thin film transistor.

Optionally, in an embodiment, in a case that a first slope of the output characteristic curve is not equal to 0, the first slope is a slope of the output characteristic curve in a saturation region, and the processing module 720 is further configured to:

determine a current adjustment amount of the $N^{th}$ frame of image according to the drive voltage of the $N^{th}$ frame of image and the first slope; and determine a brightness compensation amount of the $N^{th}$ frame of image according to the current adjustment amount of the $N^{th}$ frame of image, where the brightness compensation amount of the $N^{th}$ frame of image is used for performing brightness compensation on the $N^{th}$ frame of image by the display assembly.

Optionally, in an embodiment, the processing module 720 is further configured to:

send the brightness compensation amount of the $N^{th}$ frame of image to the display assembly.

Optionally, in an embodiment, the processing module 720 is further configured to:

receive a synchronization signal sent by the display assembly, where the synchronization signal is used for indicating that the display assembly starts to display the $N^{th}$ frame of image; and send the image data of the $N^{th}$ frame of image to the display assembly.

Optionally, in an embodiment, the light-emitting body is any one of the following:

an organic light-emitting diode, an active-matrix organic light-emitting diode, a flexible light-emitting diode, a micro light-emitting diode, a micro organic light-emitting diode, or a quantum dot light-emitting diode.

It should be noted that, the terminal device 700 is represented in a form of a functional module. The term "module" herein may be implemented in the form of software and/or hardware, which is not specifically limited.

For example, the "module" may be a software program, a hardware circuit, or a combination of the two that implement the above-mentioned functions. The hardware circuit may include an application specific integrated circuit (application specific integrated circuit, ASIC), an electronic circuit, a processor (for example, a shared processor, a dedicated processor, or a packet processor) configured to execute one or more software or firmware programs, a memory, a combined logical circuit, and/or another suitable component that supports the described functions.

Therefore, the units in the examples described in reference to the embodiments of this application can be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of this application.

Figure 12:
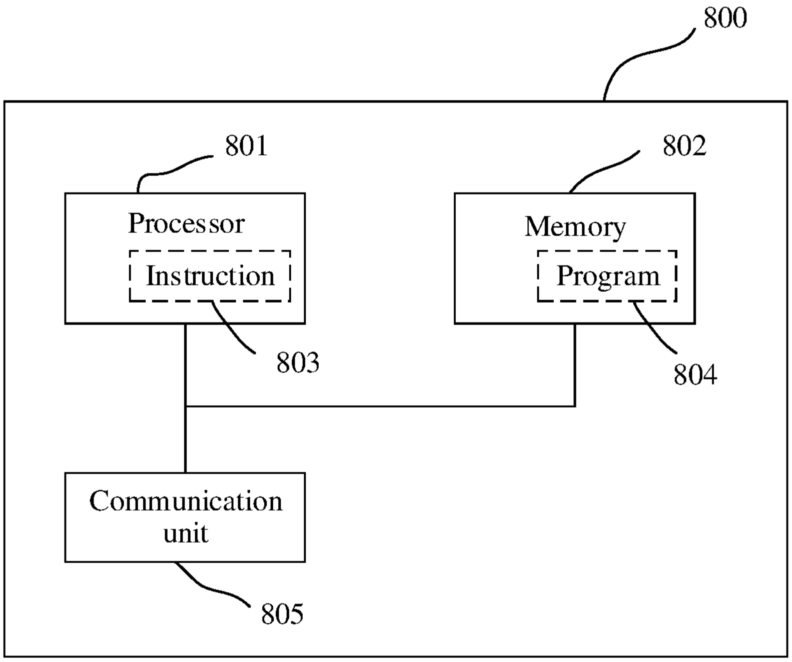
FIG. 12 is a schematic structural diagram of an electronic device according to an embodiment of this application.

FIG. 12 is a schematic structural diagram of an electronic device according to this application. A dash line in FIG. 12 represents that a unit or module is optional. An electronic device 800 may be configured to implement the methods in the foregoing method embodiments.

The electronic device 800 includes one or more processors 801, and the one or more processors 801 may support the electronic device 800 to implement the methods in the foregoing method embodiments. The processor 801 may be a general processor or a dedicated purpose processor. For example, the processor 801 may be a central processor (central processing unit, CPU), a digital signal processor (digital signal processor, DSP), an application-specific integrated circuit (application specific integrated circuit, ASIC), a field-programmable gate array (field programmable gate array, FPGA), or another programmable logic device such as a discrete gate or a transistor logic component or a discrete hardware assembly.

The processor 801 may be configured to control the terminal device 800, execute a software program, and process data of the software program. The electronic device 800 may further include a communication unit 805, configured to implement input (receiving) and output (sending) of a signal.

For example, the electronic device 800 may be a chip, and the communication unit 805 may be an input and/or output circuit of the chip, or the communication unit 805 may be a communication interface of the chip, and the chip may be used as a component of a terminal device or other electronic device.

In another example, the electronic device 800 may be a terminal device, and the communication unit 805 may be a transceiver of the terminal device, or the communication unit 805 may be a transceiver circuit of the terminal device.

For example, the electronic device 800 may include one or more memories 802 on which a program 804 is stored, and the program 804 may be executed by the processor 801 to generate instructions 803, so that the processor 801 executes the methods described in the above method embodiments according to the instructions 803.

Optionally, the memory 802 may also store data. Optionally, the processor 801 may also read the data stored in the memory 802 (for example, image data of an $N^{th}$ frame of image), the data may be stored in the same storage address as the program 804, and the data may also be stored in a storage address different from that of the program 804.

Optionally, the processor 801 and the memory 802 may be disposed separately or integrated together, for example, integrated on a system on chip (system on chip, SOC) of the terminal device.

Exemplarily, the memory 802 may be configured to store the program 804 related to the method for adjusting a drive voltage of a display assembly provided in the embodiments of this application, and the processor 801 may be configured to invoke the program 804 related to the method stored in the memory 802 when performing adjustment of the drive voltage of the display assembly, to execute the method of the embodiments of this application: for example, obtaining image data of an $N^{th}$ frame of image, where N is a positive integer; obtaining a highest gray scale of the $N^{th}$ frame of image according to the image data, where the highest gray scale of the $N^{th}$ frame of image is a maximum value of gray scales corresponding to pixels in the $N^{th}$ frame of image; obtaining a drive voltage of the $N^{th}$ frame of image according to the highest gray scale of the $N^{th}$ frame of image, where the drive voltage of the $N^{th}$ frame of image is a voltage required in a case that the display assembly displays the $N^{th}$ frame of image; and sending a voltage adjustment amount of the $N^{th}$ frame of image to the display assembly, where the voltage adjustment amount of the $N^{th}$ frame of image is obtained according to the drive voltage of the $N^{th}$ frame of image.

This application further provides a computer program product, the computer program product, when executed by a processor 801, implementing the method for adjusting a drive voltage of a display assembly described in any one of the method embodiments of this application.

The computer program product may be stored in a memory 802, such as a program 804, and the program 804 is finally converted into an executable object file that can be executed by the processor 801 through processing processes such as preprocessing, compilation, assembly, and linking.

This application further provides a computer-readable storage medium, storing a computer program, the computer program, when executed by a computer, implementing the method for adjusting a drive voltage of a display assembly described in any one of the method embodiments of this application. The computer program may be a high-level language program or an executable object program.

The computer-readable storage medium may be, for example, a memory 802. The memory 802 may be a volatile memory or a non-volatile memory, or the memory 802 may simultaneously include a volatile memory and a non-volatile memory. The non-volatile memory may be a read-only memory (read-only memory, ROM), a programmable ROM (programmable ROM, PROM), an erasable PROM (erasable PROM, EPROM), an electrically EPROM (electrically EPROM, EEPROM), or a flash memory. The volatile memory may be a random access memory (random access memory, RAM), and is used as an external cache. By way of example but not limitation, RAMs in many forms such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM) may be used.

It should be noted that, although the electronic device 800 shows only the memory, the processor, and the communication unit, in a specific implementation process, a person skilled in the art should understand that the electronic device 800 may further include another component that is essential for implementing normal running. In addition, according to a specific requirement, a person skilled in the art should understand that the electronic device 800 may further include a hardware component for implementing another additional function. In addition, a person skilled in the art should understand that the foregoing electronic device 800 may alternatively include only devices required to implement the embodiments of this application, and does not need to include all devices shown in FIG. 12.

A person of ordinary skill in the art may notice that the exemplary units and algorithm steps described with reference to the embodiments disclosed in this specification can be implemented in electronic hardware, or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of this application.

Persons skilled in the art can clearly understand that for convenience and conciseness of description, for specific working processes of the foregoing described system, apparatus and unit, reference may be made to the corresponding processes in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate components may or may not be physically separate, and components displayed as units may or may not be physical units, may be located in one position, or may be distributed on a plurality of network units. Some or all of the units may be selected according to an actual requirement to achieve the objectives of the solutions in the embodiments.

In addition, functional units in the embodiments of this application may be integrated into one processing unit, or each of the units may be physically separated, or two or more units may be integrated into one unit.

If implemented in the form of software functional units and sold or used as an independent product, the functions may also be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiment of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

In addition, the terms "system" and "network" in this specification may be used interchangeably in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

In conclusion, what are described above are merely examples of embodiments of the technical solutions of this application, but is not intended to limit the protection scope of this application. Any modification, equivalent replacement, or improvement made within the spirit and principle of this application shall fall within the protection scope of this application.

What is claimed is:

1. A method of adjusting, for a terminal device comprising an active light-emitting display assembly, a drive voltage of the display assembly, the method comprising:

obtaining, by the terminal device, image data of an Nth frame of image, wherein the image data of the Nth frame of image is data of a to-be-displayed frame of image, wherein N is a positive integer, and wherein the display assembly comprises a pixel driving circuit, the pixel driving circuit comprises a first thin film transistor and a light-emitting body, and the first thin film transistor is configured to provide a drive current for the light-emitting body;

obtaining, by the terminal device, a highest gray scale of the Nth frame of image according to the image data, wherein the highest gray scale of the Nth frame of image is a maximum value of gray scales corresponding to pixels in the Nth frame of image;

obtaining, by the terminal device, a minimum current required by the light emitting body in the pixel driving circuit according to the highest gray scale of the Nth frame of image, and obtaining a minimum voltage difference between a drain and a source required by the light-emitting body according to the obtained minimum current required and an output characteristic curve of the first thin film transistor;

obtaining, by the terminal device, a drive voltage of the Nth frame of image according to the minimum voltage difference between the drain and the source to determine a voltage adjustment amount of the Nth frame of image;

sending, by the terminal device, the voltage adjustment amount of the Nth frame of image to the display assembly, wherein the voltage adjustment amount of the Nth frame of image is an absolute value of a drive voltage when the display assembly displays the Nth frame of image;

determining that a first slope of the output characteristic curve is not equal to 0, wherein the first slope is a slope of the output characteristic curve in a saturation region;

determining, by the terminal device, a current adjustment amount of the Nth frame of image of the drive voltage of the Nth frame of image and the first slope;

determining, by the terminal device, a brightness compensation amount of the Nth frame of image of the current adjustment amount of the Nth frame of image; and sending, by the terminal device, the brightness compensation amount of the Nth frame of image to the display assembly.

2. The method of claim 1, wherein the voltage adjustment amount of the Nth frame of image is a voltage value of the drive voltage of the Nth frame of image.

3. The method of claim 1, wherein the voltage adjustment amount of the Nth frame of image is a voltage difference between the drive voltage of the Nth frame of image and a first drive voltage, and the first drive voltage is a drive voltage of an (N−1)th frame of image.

4. The method of claim 1, wherein the obtaining, by the terminal device, a highest gray scale of the Nth frame of image according to the image data comprises:

obtaining, by the terminal device, a histogram of the Nth frame of image of the image data; and obtaining, by the terminal device, the highest gray scale of the Nth frame of image of the histogram of the Nth frame of image.

5. The method of claim 1, further comprising:

receiving, by the terminal device, a synchronization signal sent by the display assembly, wherein the synchronization signal is used for indicating that the display assembly starts to display the Nth frame of image; and sending, by the terminal device, the image data of the Nth frame of image to the display assembly.

6. The method of claim 1, wherein the light-emitting body is any one of the following:

an organic light-emitting diode, an active-matrix organic light-emitting diode, a flexible light-emitting diode, a micro light-emitting diode, a micro organic light-emitting diode, or a quantum dot light-emitting diode.

7. The method of claim 1, wherein a plurality of pixel driving circuits included in the $N^{th}$ frame of image share one drive voltage.

8. A terminal device, comprising:

one or more processors;

an active light-emitting display assembly, wherein the display assembly comprises a pixel driving circuit, the pixel driving circuit comprises a first thin film transistor and a light-emitting body, and the first thin film transistor is configured to provide a drive current for the light-emitting body; and a storage device storing instructions that, when executed by the processor, cause an electronic device to be configured to:

obtain image data of an Nth frame of image, wherein the image data of the Nth frame of image is data of a to-be-displayed frame of image, and wherein N is a positive integer;

obtain a highest gray scale of the Nth frame of image according to the image data, wherein the highest gray scale of the Nth frame of image is a maximum value of gray scales corresponding to pixels in the Nth frame of image;

obtain a minimum current required by the light emitting body in the pixel driving circuit according to the highest gray scale of the Nth frame of image, and obtain a minimum voltage difference between a drain and a source required by the light-emitting body according to the obtained minimum current required and an output characteristic curve of the first thin film transistor;

obtain a drive voltage of the Nth frame of image according to the minimum voltage difference between the drain and the source to determine a voltage adjustment amount of the Nth frame of image; and send a voltage adjustment amount of the Nth frame of image to the display assembly, wherein the voltage adjustment amount of the Nth frame of image is an absolute value of a drive voltage when the display assembly displays the Nth frame of image;

determine that a first slope of the output characteristic curve is not equal to 0, wherein the first slope is a slope of the output characteristic curve in a saturation region;

determine, by the terminal device, a current adjustment amount of the Nth frame of image of the drive voltage of the Nth frame of image and the first slope;

determine, by the terminal device, a brightness compensation amount of the Nth frame of image of current adjustment amount of the Nth frame of image; and send, by the terminal device, the brightness compensation amount of the Nth frame of image to the display assembly.

9. The terminal device of claim 8, wherein the voltage adjustment amount of the Nth frame of image is a voltage value of the drive voltage of the Nth frame of image.

10. The terminal device of claim 8, wherein the voltage adjustment amount of the Nth frame of image is a voltage difference between the drive voltage of the Nth frame of image and a first drive voltage, and the first drive voltage is a drive voltage of an (N−1)th frame of image.

11. The terminal device of claim 8, wherein the obtain a highest gray scale of the Nth frame of image according to the image data comprises:

obtain a histogram of the Nth frame of image of the image data; and obtain the highest gray scale of the Nth frame of image of the histogram of the Nth frame of image.

12. The terminal device of claim 8, the terminal device is further configured to:

receive a synchronization signal sent by the display assembly, wherein the synchronization signal is used for indicating that the display assembly starts to display the Nth frame of image; and send the image data of the Nth frame of image to the display assembly.

13. The terminal device of claim 8, wherein the light-emitting body is any one of the following:

an organic light-emitting diode, an active-matrix organic light-emitting diode, a flexible light-emitting diode, a micro light-emitting diode, a micro organic light-emitting diode, or a quantum dot light-emitting diode.

14. A chip system for a terminal device comprising an active light-emitting display assembly, comprising:

one or more processors;

wherein the processors invoke computer instructions to cause the terminal device to perform operations comprising:

obtaining image data of an Nth frame of image, wherein the image data of the Nth frame of image is data of a to-be-displayed frame of image, wherein N is a positive integer, and wherein the display assembly comprises a pixel driving circuit, the pixel driving circuit comprises a first thin film transistor and a light-emitting body, and the first thin film transistor is configured to provide a drive current for the light-emitting body;

obtaining a highest gray scale of the Nth frame of image according to the image data, wherein the highest gray scale of the Nth frame of image is a maximum value of gray scales corresponding to pixels in the Nth frame of image;

obtaining a minimum current required by the light emitting body in the pixel driving circuit according to the highest gray scale of the Nth frame of image, and obtaining a minimum voltage difference between a drain and a source required by the light-emitting body according to the obtained minimum current required and an output characteristic curve of the first thin film transistor;

obtaining a drive voltage of the Nth frame of image according to the to determine a voltage adjustment amount of displays the Nth frame of image; and sending the voltage adjustment amount of the Nth frame of image to the display assembly, wherein the voltage adjustment amount of the Nth frame of image is an absolute value of a drive voltage when the display assembly displays the Nth frame of image;

determining that a first slope of the output characteristic curve is not equal to 0, wherein the first slope is a slope of the output characteristic curve in a saturation region;

determining, by the terminal device, a current adjustment amount of the Nth frame of image of the drive voltage of the Nth frame of image and the first slope;

determining, by the terminal device, a brightness compensation amount of the Nth frame of image of the current adjustment amount of the Nth frame image; and sending, by the terminal device, the brightness compensation amount of the Nth frame of image to the display assembly.

15. The chip system of claim 14, wherein the voltage adjustment amount of the Nth frame of image is a voltage value of the drive voltage of the Nth frame of image.

16. The chip system of claim 14, wherein the voltage adjustment amount of the Nth frame of image is a voltage difference between the drive voltage of the Nth frame of image and a first drive voltage, and the first drive voltage is a drive voltage of an (N−1)th frame of image.

17. The chip system of claim 14, wherein the obtain a highest gray scale of the Nth frame of image according to the image data comprises:

obtain a histogram of the Nth frame of image of the image data; and obtain the highest gray scale of the Nth frame of image of the histogram of the Nth frame of image.

18. The chip system of claim 14, the terminal device is further configured to:

receive a synchronization signal sent by the display assembly, wherein the synchronization signal is used for indicating that the display assembly starts to display the Nth frame of image; and send the image data of the Nth frame of image to the display assembly.

19. The chip system of claim 14, wherein the light-emitting body is any one of the following:

an organic light-emitting diode, an active-matrix organic light-emitting diode, a flexible light-emitting diode, a micro light-emitting diode, a micro organic light-emitting diode, or a quantum dot light-emitting diode.

* * * * *